United States Patent
Tateishi et al.

(10) Patent No.: US 9,397,986 B2
(45) Date of Patent: Jul. 19, 2016

(54) AUTHENTICATING ACCEPTANCE OF A STRING USING AN AUTOMATON

(71) Applicant: GLOBALFOUNDRIES INC., Grand Cayman (KY)

(72) Inventors: Takaaki Tateishi, Yamato (JP); Yuji Watanabe, Tokyo (JP)

(73) Assignee: GLOBALFOUNDRIES INC., Grand Cayman (KY)

( * ) Notice: Subject to any disclaimer, the term of this patent is extended or adjusted under 35 U.S.C. 154(b) by 90 days.

(21) Appl. No.: 14/372,466

(22) PCT Filed: Jan. 10, 2013

(86) PCT No.: PCT/JP2013/050263
§ 371 (c)(1),
(2) Date: Jul. 16, 2014

(87) PCT Pub. No.: WO2013/108698
PCT Pub. Date: Jul. 25, 2013

(65) Prior Publication Data
US 2015/0033018 A1    Jan. 29, 2015

(30) Foreign Application Priority Data
Jan. 19, 2012    (JP) ................................. 2012-009281

(51) Int. Cl.
*H04L 29/06* (2006.01)
*H04L 9/32* (2006.01)
(Continued)

(52) U.S. Cl.
CPC ............ *H04L 63/062* (2013.01); *G06F 21/445* (2013.01); *H04L 9/0819* (2013.01);
(Continued)

(58) Field of Classification Search
None
See application file for complete search history.

(56) References Cited

U.S. PATENT DOCUMENTS

2001/0046292 A1*  11/2001  Gligor .................. H04L 9/0662
                                                                    380/37
2005/0149739 A1*   7/2005  Hopkins ............... H04L 9/0625
                                                                    713/184
(Continued)

FOREIGN PATENT DOCUMENTS

JP      2009151757 A      7/2009
WO      2013108698 A1     7/2013

OTHER PUBLICATIONS

Even et al., "A Randomized Protocol for Signing Contracts", Communications of the ACM, Jun. 1985, vol. 28, No. 6, pp. 637-647, © 1985 ACM.
Freedman et al., "Efficient Private Matching and Set Intersection", EUROCRYPT 2004, LNCS 3027, pp. 1-19, © International Association for Cryptologic Research 2004.

(Continued)

*Primary Examiner* — Shin-Hon Chen
(74) *Attorney, Agent, or Firm* — Scully Scott Murphy and Presser

(57) ABSTRACT

Provided is a server connectable to a client for input of a string and that has an automaton defining a subsequent state for transition for each state and each character. This server has a key chain generating unit for generating a key chain for each combination of index, character and state expressing the position of each character in a string, the key chain having encrypted keys for the next index corresponding to the subsequent state of transition from the current state in accordance with the character on the basis of the key corresponding to the current state, and a providing unit for communicating with a client and providing to the client a key chain corresponding to each inputted key among a set of key chains for each index in a state concealing the inputted characters from the client.

20 Claims, 23 Drawing Sheets

(51) Int. Cl.
*G06F 21/44* (2013.01)
*G06F 21/00* (2013.01)
*G06F 11/30* (2006.01)
*G06F 12/14* (2006.01)
*H04L 9/08* (2006.01)

(52) U.S. Cl.
CPC ............ *H04L9/0861* (2013.01); *H04L 9/3226*
(2013.01); *H04L 63/08* (2013.01); *H04L 67/42*
(2013.01); *H04L 9/0863* (2013.01); *H04L*
*2209/24* (2013.01); *H04L 2463/061* (2013.01)

(56) References Cited

U.S. PATENT DOCUMENTS

| | | | | |
|---|---|---|---|---|
| 2009/0080647 | A1* | 3/2009 | Mantin ................ | H04L 9/0637 380/29 |
| 2010/0275028 | A1* | 10/2010 | Takashima ............ | H04L 9/3247 713/176 |
| 2011/0145576 | A1* | 6/2011 | Bettan ................ | H04L 63/0435 713/168 |
| 2012/0114120 | A1* | 5/2012 | Kambayashi ......... | H04L 9/0897 380/44 |
| 2012/0144208 | A1* | 6/2012 | Kim ........................ | G06F 21/14 713/190 |
| 2012/0269340 | A1* | 10/2012 | Stu ........................ | H04L 9/0822 380/28 |

OTHER PUBLICATIONS

Frikken, Keith B., "Practical Private DNA String Searching and Matching through Efficient Oblivious Automata Evaluation", Department of Computer Science and Systems Analysis, Miami University, Oxford OH 45056, pp. 81-94.

Gennaro et al., "Text Search Protocols with Simulation Based Security", PKC 2010, LNCS 6056, pp. 332-350, 2010, © International Association for Cryptologic Research 2010.

Hazay et al., "Efficient Protocols for Set Intersection and Pattern Matching with Security Against Malicious and Covert Adversaries", TCC 2008, LNCS 4948, pp. 155-175, 2008, © International Association for Cryptologic Research 2008.

Kissner et al., "Privacy-Preserving Set Operations", Crypto 2005, LNCS 3621, pp. 241-257, 2005, © International Association for Cryptologic Research 2005.

Kruger et al., "Secure Function Evaluation with Ordered Binary Decision Diagrams", CCS'06, Oct. 30-Nov. 3, 2006, Alexandria, Virginia, USA, pp. 410-420, Copyright 2006 ACM.

Naor et al., "Efficient Oblivious Transfer Protocols", SODA2001, Jan. 7-9, 2001, Washington, DC, USA.

Nojima, Ryo, "On the Construction of Fast Secure Set-Intersection Protocols", Applied Cryptography, pp. 9-14.

Troncoso-Pastoriza et al., "Privacy Preserving Error Resilient DNA Searching through Oblivious Automata", CCS'07, Oct. 29-Nov. 2, 2007, Alexandria, Virginia, USA, Copyright 2007 ACM.

* cited by examiner

| State | Key For Each State of 1st Index | Key For Each State of 2nd Index | Key For Each State of 3rd Index | Key For Each State of Final Transition |
|---|---|---|---|---|
| a | $r_{a0}$ | $r_{a1}$ | $r_{a2}$ | $r_{a3}$ |
| b | $r_{b0}$ | $r_{b1}$ | $r_{b2}$ | $r_{b3}$ |
| c | $r_{c0}$ | $r_{c1}$ | $r_{c2}$ | $r_{c3}$ |

FIG. 5

| Index | Character | State | Key Chain Set |
|---|---|---|---|
| 1 | 0 | a | $Enc(r_{a0}, r_{a1})$ |
| | | b | $Enc(r_{b0}, r_{a1})$ |
| | | c | $Enc(r_{c0}, r_{c1})$ |
| | 1 | a | $Enc(r_{a0}, r_{b1})$ |
| | | b | $Enc(r_{b0}, r_{c1})$ |
| | | c | $Enc(r_{c0}, r_{c1})$ |
| 2 | 0 | a | $Enc(r_{a1}, r_{a2})$ |
| | | b | $Enc(r_{b1}, r_{a2})$ |
| | | c | $Enc(r_{c1}, r_{c2})$ |
| | 1 | a | $Enc(r_{a1}, r_{b2})$ |
| | | b | $Enc(r_{b1}, r_{c2})$ |
| | | c | $Enc(r_{c1}, r_{c2})$ |
| 3 | 0 | a | $Enc(r_{a2}, r_{a3})$ |
| | | b | $Enc(r_{b2}, r_{a3})$ |
| | | c | $Enc(r_{c2}, r_{c3})$ |
| | 1 | a | $Enc(r_{a2}, r_{b3})$ |
| | | b | $Enc(r_{b2}, r_{c3})$ |
| | | c | $Enc(r_{c2}, r_{c3})$ |

FIG. 7

|   | Final State Information |
|---|---|
| a | $Enc(r_{a3}, 1)$ |
| b | $Enc(r_{b3}, 0)$ |
| c | $Enc(r_{c3}, 0)$ |

FIG. 8

1st Index

| Character | Indexed State Transition Value |
|---|---|
| 0 | f(1,0) |
| 1 | f(1,1) |

2nd Index

| Character | Indexed State Transition Value |
|---|---|
| 0 | f(2,0) |
| 1 | f(2,1) |

3rd Index

| Character | Indexed State Transition Value |
|---|---|
| 0 | f(3,0) |
| 1 | f(3,1) |

FIG. 9

| Index | Character | State | Key Chain Set Associated With Indexed State Transition Value |
|---|---|---|---|
| 1 | 0 | a | $f(1,0), Enc(r_{a0}, r_{a1})$ |
| | | b | $f(1,0), Enc(r_{b0}, r_{a1})$ |
| | | c | $f(1,0), Enc(r_{c0}, r_{c1})$ |
| | 1 | a | $f(1,1), Enc(r_{a0}, r_{b1})$ |
| | | b | $f(1,1), Enc(r_{b0}, r_{c1})$ |
| | | c | $f(1,1), Enc(r_{c0}, r_{c1})$ |
| 2 | 0 | a | $f(2,0), Enc(r_{a1}, r_{a2})$ |
| | | b | $f(2,0), Enc(r_{b1}, r_{a2})$ |
| | | c | $f(2,0), Enc(r_{c1}, r_{c2})$ |
| | 1 | a | $f(2,1), Enc(r_{a1}, r_{b2})$ |
| | | b | $f(2,1), Enc(r_{b1}, r_{c2})$ |
| | | c | $f(2,1), Enc(r_{c1}, r_{c2})$ |
| 3 | 0 | a | $f(3,0), Enc(r_{a2}, r_{a3})$ |
| | | b | $f(3,0), Enc(r_{b2}, r_{a3})$ |
| | | c | $f(3,0), Enc(r_{c2}, r_{c3})$ |
| | 1 | a | $f(3,1), Enc(r_{a2}, r_{b3})$ |
| | | b | $f(3,1), Enc(r_{b2}, r_{c3})$ |
| | | c | $f(3,1), Enc(r_{c2}, r_{c3})$ |

FIG. 10

| Index | Character | Response Ciphertext | | Decryption Result |
|---|---|---|---|---|
| 1 | 0 | $E(r_1-P(f(1,0))+S_{a10})$ | → | $Enc(r_{a0}, r_{a1})$ |
| | | $E(r_2-P(f(1,0))+S_{b10})$ | → | $Enc(r_{b0}, r_{a1})$ |
| | | $E(r_3-P(f(1,0))+S_{c10})$ | → | $Enc(r_{c0}, r_{c1})$ |
| | 1 | $E(r_4-P(f(1,1))+S_{a11})$ | → | × |
| | | $E(r_5-P(f(1,1))+S_{b11})$ | → | × |
| | | $E(r_6-P(f(1,1))+S_{c11})$ | → | × |
| 2 | 0 | $E(r_7-P(f(2,0))+S_{a20})$ | → | × |
| | | $E(r_8-P(f(2,0))+S_{b20})$ | → | × |
| | | $E(r_9-P(f(2,0))+S_{c20})$ | → | × |
| | 1 | $E(r_{10}-P(f(2,1))+S_{a21})$ | → | $Enc(r_{a1}, r_{a2})$ |
| | | $E(r_{11}-P(f(2,1))+S_{b21})$ | → | $Enc(r_{b1}, r_{a2})$ |
| | | $E(r_{12}-P(f(2,1))+S_{c21})$ | → | $Enc(r_{c1}, r_{c2})$ |
| 3 | 0 | $E(r_{13}-P(f(3,0))+S_{a30})$ | → | $Enc(r_{a2}, r_{a3})$ |
| | | $E(r_{14}-P(f(3,0))+S_{b30})$ | → | $Enc(r_{b2}, r_{a3})$ |
| | | $E(r_{15}-P(f(3,0))+S_{c30})$ | → | $Enc(r_{c2}, r_{c3})$ |
| | 1 | $E(r_{16}-P(f(3,1))+S_{a31})$ | → | × |
| | | $E(r_{17}-P(f(3,1))+S_{b31})$ | → | × |
| | | $E(r_{18}-P(f(3,1))+S_{c31})$ | → | × |

FIG. 12

Key Chain Set For 1st Index

| Character | Previous state | Key Chain |
|---|---|---|
| 0 | a<br>b<br>c | Subset For Character 0<br>$\text{Enc}(r_{a0}, r_{a1})$<br>$\text{Enc}(r_{b0}, r_{a1})$<br>$\text{Enc}(r_{c0}, r_{c1})$ |
| 1 | a<br>b<br>c | Subset For Character 1<br>$\text{Enc}(r_{a0}, r_{b1})$<br>$\text{Enc}(r_{b0}, r_{c1})$<br>$\text{Enc}(r_{c0}, r_{c1})$ |

FIG. 17

Key Chain Set For 2nd Index

| Character | Previous state | Key Chain |
|---|---|---|
| 0 | a<br>b<br>c | Subset For Character 0<br>$\text{Enc}(r_{a1}, r_{a2})$<br>$\text{Enc}(r_{b1}, r_{a2})$<br>$\text{Enc}(r_{c1}, r_{c2})$ |
| 1 | a<br>b<br>c | Subset For Character 1<br>$\text{Enc}(r_{a1}, r_{b2})$<br>$\text{Enc}(r_{b1}, r_{c2})$<br>$\text{Enc}(r_{c1}, r_{c2})$ |

FIG. 18

Key Chain Set For 3rd Index

| Character | Previous state | Key Chain |
|---|---|---|
| 0 | a | Subset For Character 0: $Enc(r_{a2}, r_{a3})$ |
|   | b | $Enc(r_{b2}, r_{a3})$ |
|   | c | $Enc(r_{c2}, r_{a3})$ |
| 1 | a | Subset For Character 1: $Enc(r_{a2}, r_{b3})$ |
|   | b | $Enc(r_{b2}, r_{c3})$ |
|   | c | $Enc(r_{c2}, r_{c3})$ |

AUTHENTICATING ACCEPTANCE OF A STRING USING AN AUTOMATON

BACKGROUND OF THE INVENTION

The present invention relates generally to the field of encryption using an automaton, and more particularly to authenticating whether or not a string has been accepted by an automaton.

SUMMARY

A first aspect of the present invention provides a server connectable to a client for input of a string and having an automaton defining a subsequent state of transition for each state and character. The server includes a key chain generating unit for generating a key chain for each combination of index, character and state expressing the position of each character in a string, the key chain having encrypted keys for the next index corresponding to the subsequent state of transition from the current state in accordance with the character on the basis of the key corresponding to the current state, and a providing unit for communicating with a client and providing to the client a key chain corresponding to each inputted key among a set of key chains for each index in a state concealing the inputted characters from the client. Also provided are a method and program for information processing executed by this server.

A second aspect of the present invention provides a client for inputting a string which is able to communicate with a server having an automaton defining a subsequent state of transition for each state and each character. The client comprises a receiving unit for communicating with the server and receiving from the server a plurality of key chains corresponding to an inputted character for each index, and a decrypting unit for obtaining a key corresponding to the next index by performing decryption processing on the plurality of received key chains using keys obtained by the decryption processing corresponding to the previous index in the sequential order of the indices. Also provided are a method and program for information processing executed by this client.

It should be noted that the above summary of the present invention is not intended to enumerate all of the features required of the present invention. In addition, sub-combinations of these groups of characteristics also constitute the present invention.

BRIEF DESCRIPTION OF THE DRAWINGS

FIG. 5 shows an example of keys for various states generated for each index;

FIG. 7 shows an example of a set of key chains generated for each combination of indices, characters and states;

FIG. 8 shows an example of final state information;

FIG. 9 shows an example of indexed state transition values from the first index to the third index when a binary character of "0" or "1" is inputted;

FIG. 10 shows an example of sets of key chains associated with indexed state transition values;

FIG. 12 shows an example of a plurality of response ciphertexts received by the client 30 and a plurality of key chains obtained by decrypting the plurality of response ciphertexts in the present embodiment;

FIG. 17 shows an example of a set of key chains for the first index;

FIG. 18 shows an example of a set of key chains for the second index;

FIG. 19 shows an example of a set of key chains for the third index;

DETAILED DESCRIPTION

The following is an explanation of the present invention with reference to an embodiment of the present invention. However, the present embodiment does not limit the present invention in the scope of the claims. Also, all combinations of characteristics explained in the embodiment are not necessarily required in the technical solution of the present invention.

Figure 1:
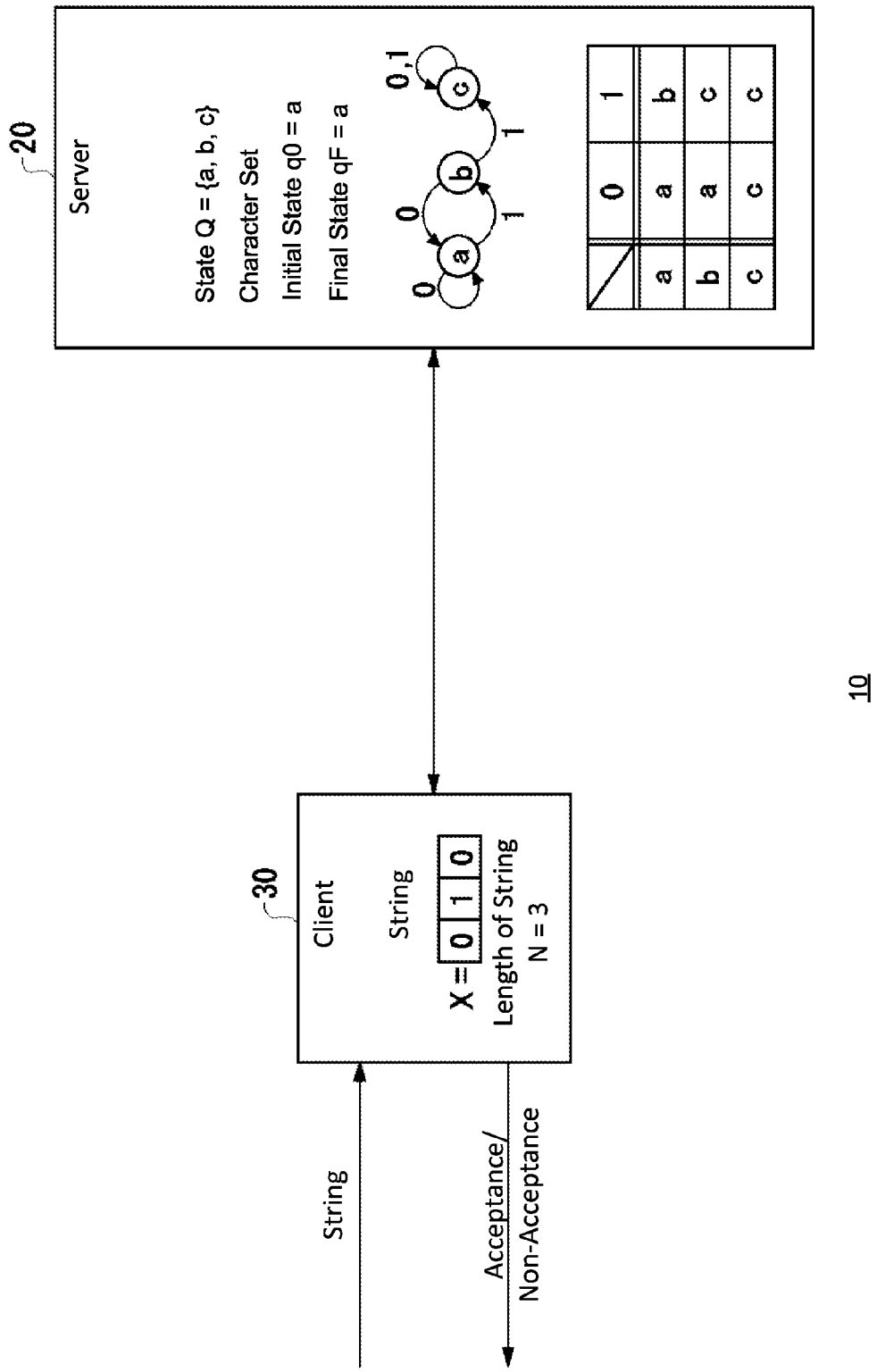
FIG. 1 shows the configuration of the authentication system 10 in the present embodiment.

FIG. 1 shows the configuration of the authentication system 10 in the present embodiment. The authentication system 10 in the present embodiment includes a server 20 and a client 30. The server 20 and the client 30 are connected to each other via a network. The authentication system 10 in the present embodiment determines whether or not an automaton held by the server 20 has transitioned to the appropriate final state on the basis of the string inputted to the client 30.

The client 30 inputs a string from an external unit, the characters included in the string can be any type of character. For example, they can be binary values with "0" and "1", or characters represented by a single byte.

The server 20 has an automaton which undergoes a state transition in accordance with the received character. The automaton defines the subsequent state of transition for each state or each character. The character received by the automaton is the character inputted to the client 30. The automaton represents the regular expression of a set of strings (group of strings) registered beforehand. The automaton receives each character in a string in sequential order from the head, and transitions to a state in sequential order for each character from the character at the head. After receiving the final character and undergoing a transition, the automaton outputs "accepted" if it transitions to the appropriate final state. It outputs "not accepted" if it does not transition to the appropriate final state.

In such a server 20 and client 30, the string inputted by the client 30 is concealed from the server 20, and the automaton held by the server 20 is concealed from the client 30. Here, the automaton held by the server 20 determines whether or not there has been a transition to the appropriate final state based on the string inputted to the client 30.

Figure 2:
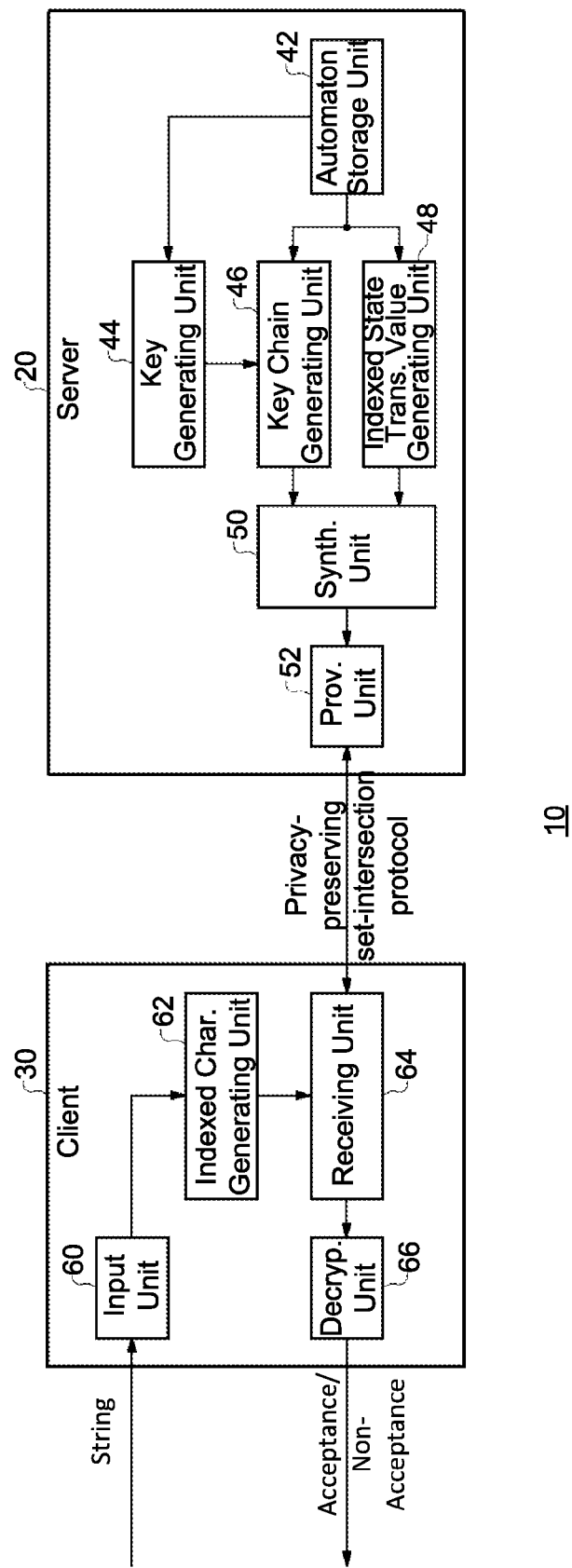
FIG. 2 shows a functional block configuration of the server 20 and the client 30 in the present embodiment.

FIG. 2 shows a functional block configuration of the server 20 and the client 30 in the present embodiment. The server 20 has an automaton storage unit 42, a key generating unit 44, a key chain generating unit 46, an indexed state transition value generating unit 48, a synthesis unit 50, and a providing unit 52. The client 30 has an input unit 60, an indexed character generating unit 62, a receiving unit 64, and a decryption unit 66.

The input unit 60 of the client 30 inputs each character in the string one at a time. The input unit 60 delivers each inputted character to the indexed character generating unit 62.

The indexed character generating unit 62 generates an indexed character for each character in the string. Here, the index represents the position of a character in the string. In other words, it represents the order in which a character is to be provided to the automaton.

Also, an index character is a value representing a grouping of a character and an index. It is obtained, for example, by assigning a value representing a character and a value representing an index to a one-way function. An indexed character can also be a value encrypted from this value or concealed so that the character and index are difficult to detect. The indexed character generating unit 62 delivers indexed characters generated from each character in the string to the receiving unit 64.

The automaton storage unit 42 of the server 20 stores an automaton for determining whether or not the string inputted to the client 30 is acceptable. The automaton storage unit 42 can include, for example, a transition table representing state transitions, a group of inputtable characters, a group of states, and the initial state and final state.

Here, the automaton undergoes a state transition for each index in accordance with the transition table. In other words, it undergoes a state transition each time a character in the string is provided from the head. A transition of the automaton from the previous state to a subsequent state in response to the application of a character is called a state transition. The combination of the state, the character, and the subsequent state in a state transition is called a state transition relationship.

The key generating unit 44 of the server 20 generates a key for each index corresponding to a plurality of states included in the automaton. The key generating unit 44 also generates a key corresponding to each state serving as a final state (the final state resulting from the reception by the automaton of the final character in a string). An example of a key generated by the key generating unit 44 will be explained below with reference to FIG. 5 and other figures.

The key chain generating unit 46 of the server 20 generates a key chain in which the key for the next index is encrypted in accordance with the final state of transition on the basis of the character from the current state using the key corresponding to the state for each combination of indices, characters and state. The key generating unit 46 generates a key chain in which the key corresponding to the final state of transition from the current state is encrypted on the basis of the character using the key corresponding to the current state in the index corresponding to the final character of the string. These keys are generated by the key generating unit 44.

In addition, the key chain generating unit 46 generates final state information in which a value is encrypted expressing whether or not the final state of transition on the basis of the key corresponding to the final transition state is the final state determined in advance by the automaton. Examples of key chain sets and final state information will be explained in detail below with reference to FIG. 4, FIG. 7 and FIG. 8.

The indexed state transition value generating unit 48 of the server 20 generates an indexed state transition value for each state transition relationship. Here, an indexed state transition value is a value representing a grouping of characters and indices that are acceptable by the automaton for each state transition. It is obtained, for example, by assigning a value representing a character and a value representing an index to a one-way function. In this situation, the one-way function is the same one-way function used to generate the indexed character. An indexed state transition value can also be a value encrypted from this value or concealed so that the character and index are difficult to detect. An example of an indexed state transition value will be explained below with reference to FIG. 9 and other figures.

The synthesis unit 50 of the server 20 associates an indexed state transition value generated by the indexed state transition value generating unit 48 for each index to each key chain in a set of key chains generated by the key chain generating unit 46. The synthesis unit 50 generates a set of key chains associated with an indexed state transition value. An example of a set of key chains associated with indexed state transition values will be explained below with reference to FIG. 10 and other figures.

The providing unit 52 of the server 20 communicates with the receiving unit 64 of the client 30. Also, the receiving unit 64 of the client 30 communicates with the providing unit 52 of the server 20.

More specifically, the providing unit 52 of the server 20 communicates with the receiving unit 64 of the client 30, and provides to the client 30 for each index a key chain corresponding to each inputted character from a key chain set in a way that conceals the inputted character. In other words, the providing unit 52 provides to the receiving unit 64 only key chains corresponding to strings inputted by the input unit 60. It does not provide to the receiving unit 64 key chains corresponding to strings not inputted by the input unit 60.

Also, the receiving unit 64 of the client 30 communicates with the providing unit 52 of the server 20, and receives from the server 20 for each index a key chain corresponding to an inputted string in a way that conceals the automaton. In other words, the receiving unit 64 receives from the providing unit 52 only key chains corresponding to strings inputted by the input unit 60. It does not receive from the providing unit 52 key chains corresponding to strings not inputted by the input unit 60.

Here, the providing unit 52 and the receiving unit 64 deliver key chains corresponding to inputted strings using a privacy-preserving set-intersection protocol which conceals elements of each other's sets while detecting the presence of shared elements in each other's sets. In this way, the providing unit 52 can provide to the receiving unit 64 key chains corresponding to inputted characters while concealing the automaton from the client 30. In addition, the receiving unit 64 receives from the providing unit 52 key chains corresponding to inputted characters while concealing the inputted character sequence from the server 20.

An example of a privacy-preserving set-intersection protocol is described in Freedman et al., "Efficient Private matching and Set Intersection". Also, an example of processing performed using a privacy-preserving set-intersection protocol will be explained below with reference to FIG. 11 and other figures.

The providing unit 52 of the server 20 also provides to the receiving unit 64 of the client 30 a key corresponding to the initial state (that is, a key for the first index corresponding to the initial state) and final state information generated by the key chain generating unit 46. Also, the receiving unit 64 of the client 30 receives from the providing unit 52 of the server 20 a key corresponding to the initial state and final state information.

The decryption unit 66 obtains the key corresponding to the next index by decrypting all of the key chains received by the receiving unit 64 using a key obtained by performing decryption processing on the previous index in the sequential order of the indices. The decryption unit 66 performs decryption processing for the first index using the key for the initial state acquired separately from the server 20. The decryption unit 66 can decrypt the key corresponding to the final transition state by performing decryption processing corresponding to the final index corresponding to the final character in the string.

After obtaining the key corresponding to the final state, the decryption unit 66 obtains the final state information using the decrypted key. The decryption unit 66 determines whether or not there was a transition to the appropriate final state when the results of final state information decryption and the value representing the final state have been acquired. When the value representing the final state has been acquired, the decryption unit 66 outputs information indicating that the string has been accepted by the automaton. When the value representing the final state cannot be received, it outputs information indicating that the string has not been accepted by the automaton.

Figure 3:
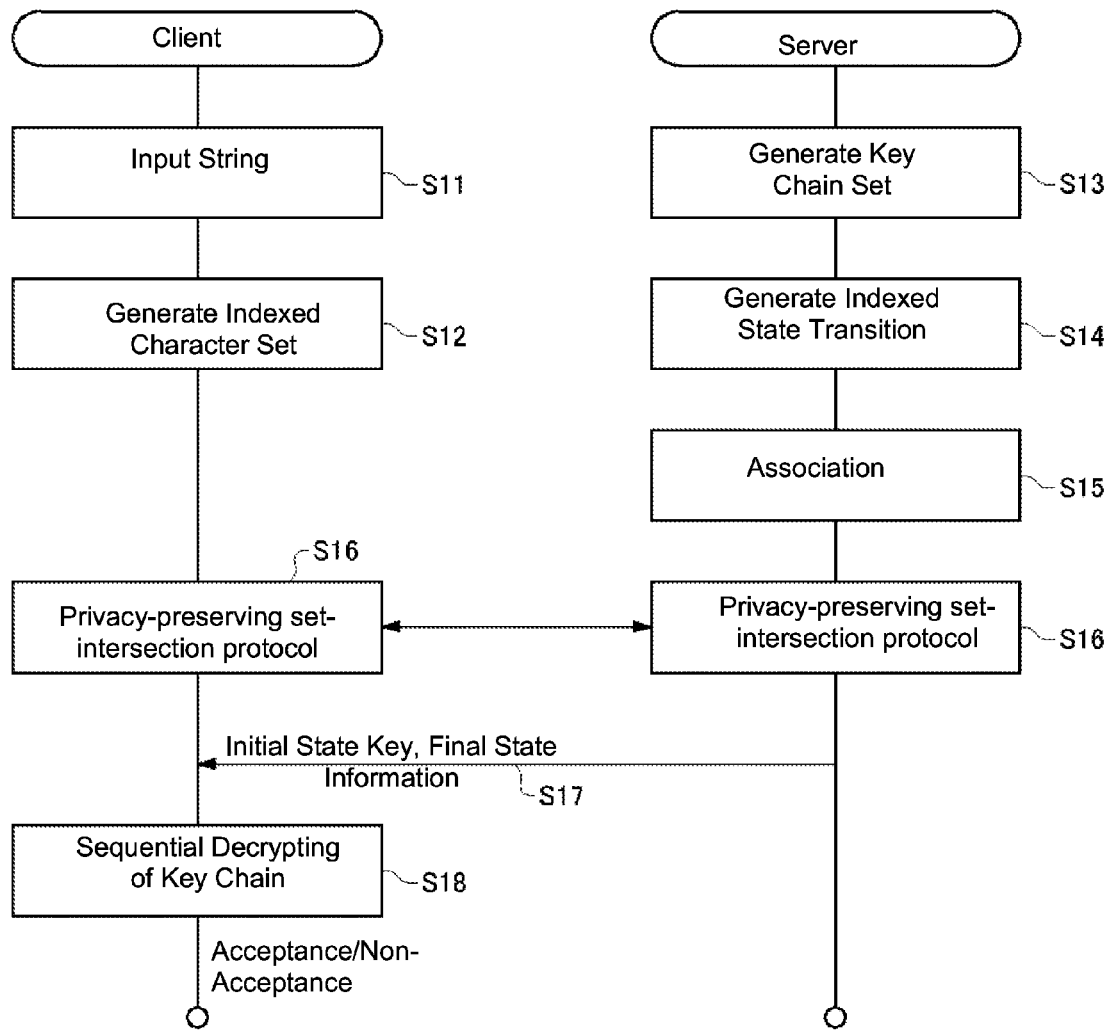
FIG. 3 shows a flowchart of processing performed by the server 20 and the client 30 in the present embodiment.

FIG. 3 shows a flowchart of processing performed by the server 20 and the client 30 in the present embodiment.

First, in Step S11, the client 30 inputs a string. The client 30 can input a string with a predetermined number of characters or can input a variable-length string. When a variable-length string is inputted, the client 30 notifies the server 20 of the number of inputted characters (that is, the number of indices).

Next, in Step S12, the client 30 generates an indexed character representing a group consisting of an index and an inputted character for each character in the inputted string. An indexed character, for example, is a value obtained by assigning a value representing an index and a value representing an inputted character to a one-way function. The content of the one-way function is determined in advance by the server 20 and the client 30.

For example, the client 30, as shown in Equation 1 below, inputs a string including N characters (where N is an integer equal to or greater than 2).

$$X_1 X_2 X_3 \ldots X_N \qquad \text{Equation 1}$$

In this situation, for example, the client 30 assigns an index of a character (that is, the order from the head of the character in the string) and a value representing the character to one-way function g( ) for each character in a string, as shown in Equation 2. In this way, the client 30 can calculate a value representing a group consisting of an index and an inputted character (indexed character).

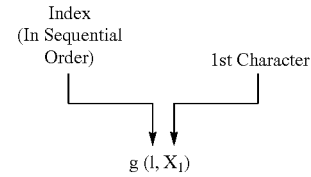

Equation 2

The client 30 performs this operation on all of the characters in the string, and generates a set of indexed characters as indicated by Equation 3 below. Next, the client 30 stores the set of indexed characters in memory.

$$g(1, X_1)$$
$$g(2, X_2)$$
$$g(3, X_3)$$
$$\vdots$$
$$g(N, X_N)$$

Equation 3

Meanwhile, in Step S13, the server 20 generates a key chain in which the key for the next index is encrypted in accordance with the next state of transition on the basis of the character from the current state using the key corresponding to the state for each index, character and state. Also, a key chain including an encrypted key corresponding to the next state of transition caused by the character is generated by the server 20 using a key corresponding to the current state in the index corresponding to the final character in the string. The key chain generating process will be explained in detail below with reference to the flowchart in FIG. 4.

Next, in Step S14, the server 20 generates an indexed state transition value based on the state transition relationship. An example of an indexed state transition value is a value obtained by assigning a value representing an index and a value representing a character in a one-way function as shown in Equation 4 below. In this way, the server 20 can calculate a value representing a group consisting of an index and a character (indexed state transition value). The one-way function for generating the indexed state transition value is the same one-way-function used by the client 30 to generate an indexed character.

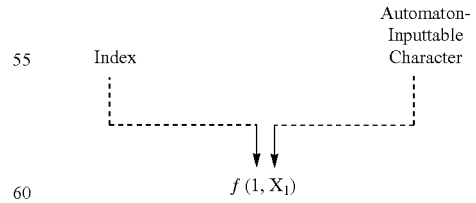

Equation 4

In Step S14, the server 20 generates an indexed state transition value for each character inputtable by the automaton with respect to each index as indicated by Equation 5 below. In Equation 5 below, σ represents the number of characters inputtable by the automaton.

$$\text{1st Index} \begin{cases} f(1, X_1) \\ f(1, X_2) \\ \vdots \\ f(1, X_\sigma) \end{cases} \quad \text{Equation 5}$$

$$\text{2nd Index} \begin{cases} f(2, X_1) \\ f(2, X_2) \\ \vdots \\ f(2, X_\sigma) \end{cases}$$

$$\vdots$$

$$n\text{th Index} \begin{cases} f(N, X_1) \\ f(N, X_2) \\ \vdots \\ f(N, X_\sigma) \end{cases}$$

Next, in Step S15, the server 20 associates the corresponding indexed state transition value with each of the plurality of generated key chains. Then, the server 20 generates a set of key chains with associated indexed state transition values. An example of a set of key chains with associated indexed transition values will be explained below with reference to FIG. 10 and other figures.

Next, in Step S16, the server 20 and the client 30 deliver a key chain corresponding to an inputted character using the privacy-preserving set-intersection protocol.

More specifically, the client 30 transmits to the server 20 transmitted ciphertext in which a set of indexed characters is encrypted for each character in the inputted string. Next, the server 20 generates response ciphertext with encrypted values becoming each key chain included in the set of key chains when the indexed state transition value is included in the set of indexed characters expressing a group of corresponding indices and corresponding characters on the basis of the transmitted ciphertext, and not becoming key chains when the indexed state transition value is not included in the set of indexed characters. The server then transmits the generated response ciphertext to the client 30.

The client 30 receives the response ciphertext from the server 20, and decrypts the received response ciphertext. In this way, the client 30 can receive a key chain corresponding to an inputted character for each index.

By performing this processing, the server 20 can provide the client 30 with key chains corresponding to inputted characters while concealing the automaton from the client 30. Also, the client 30 can receive from the server 20 key chains corresponding to inputted characters while concealing the inputted string from the server 20. An example of processing performed using the privacy-preserving set-intersection protocol will be explained below with reference to the flowchart in FIG. 11.

Next, in Step S17, the server 20 transmits to the client 30 a key corresponding to the initial state (that is, a key for the first index corresponding to the initial state) and final state information.

Next, in Step S18, the client 30 uses the keys obtained by the decryption process corresponding to the previous index in the sequential order of the indices to perform the decryption process on each key chain received from the server 20 and decrypt in sequential order the keys corresponding to the next index. In this case, the client 30 performs the decryption corresponding to the first index using the key for the initial state received separately from the server 20. Also, in the processing corresponding to the final index corresponding to the final character in the character sequence, the client 30 can decrypt the key corresponding to the final state of transition by decrypting each of the key chains received by the receiving unit 64.

After obtaining the key corresponding to the final state of transition, the client 30 obtains the final state information using the decrypted key. As a result of obtaining the final state information, the client 30 determines that there has been a transition to the appropriate final state when the value representing the final state has been acquired. When the value representing the final state has been acquired, the client 30 outputs information indicating that the string has been accepted by the automaton. When the value representing the final state has not been acquired, information is outputted indicating that the string has not been accepted by the automaton.

By performing this processing, the server 20 and the client 30 can determine using the string inputted to the client 30 whether the automaton held by the server 20 has made the transition to the appropriate final state while concealing the string inputted by the client 30 from the server 20 and while concealing the automaton held by the server 20 from the client 30.

Figure 4:
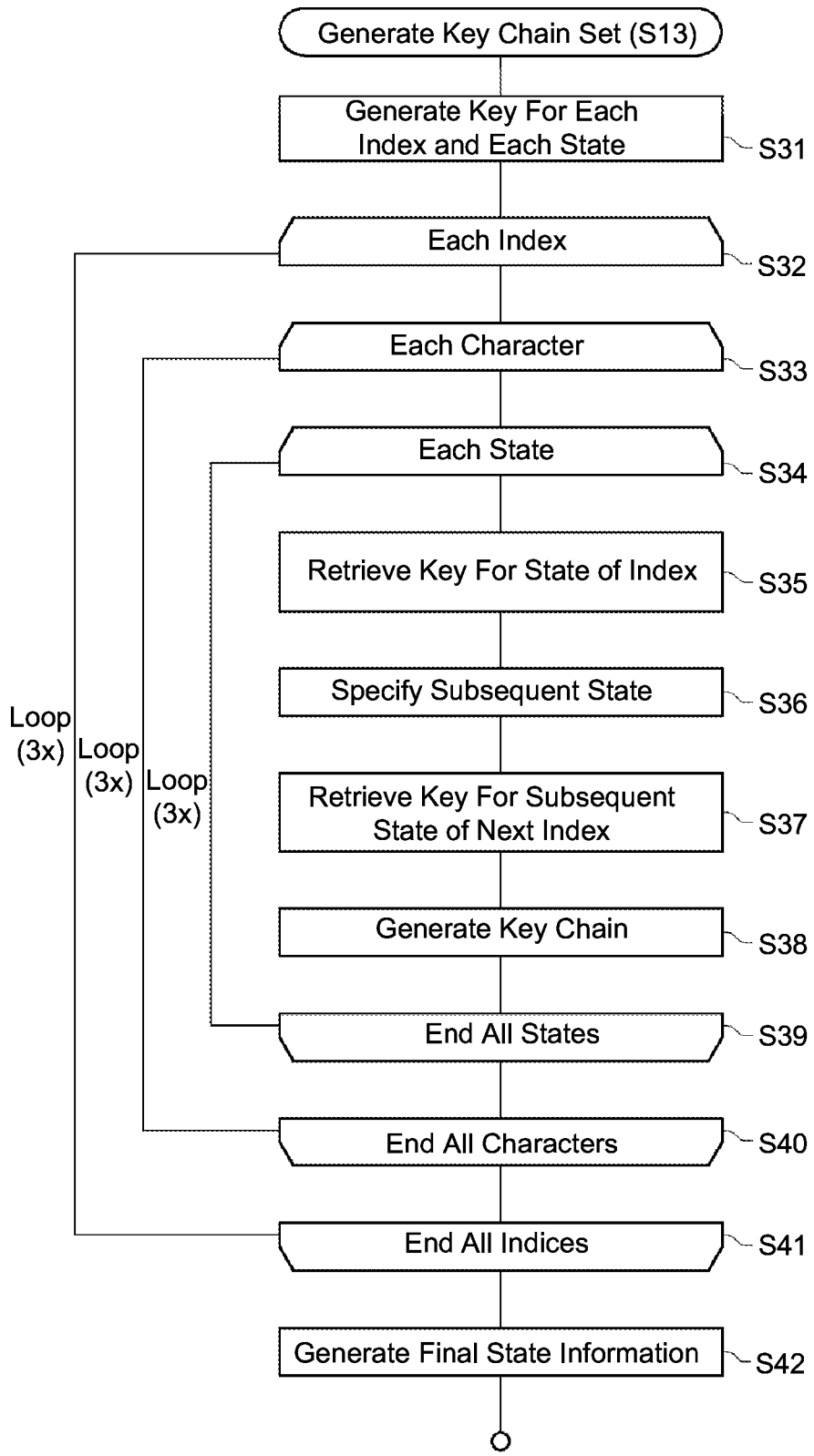
FIG. 4 shows a flowchart of the process for generating a set of key chains.
Figure 6:
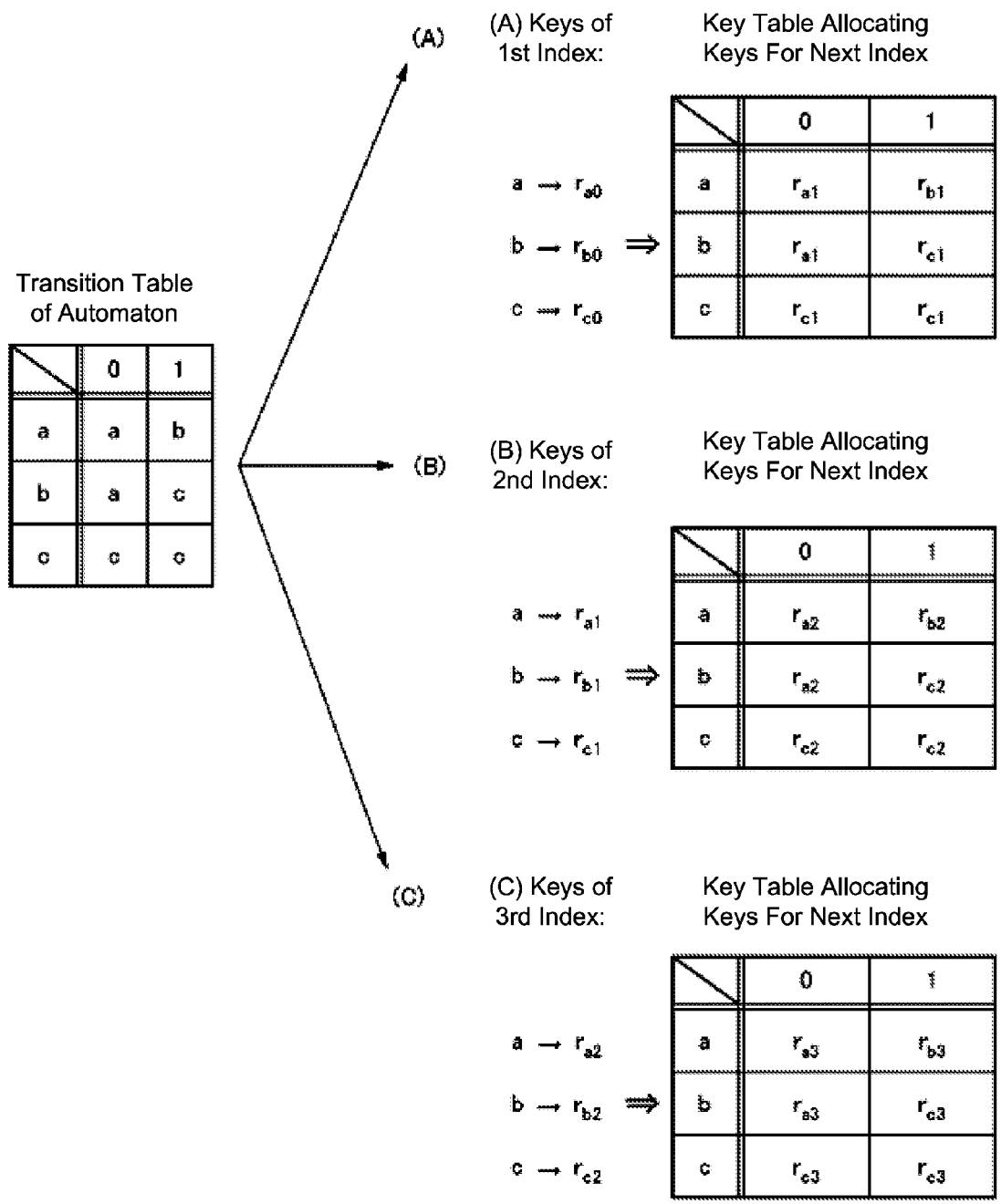
FIG. 6 shows an example of a transition table for an automaton, and key tables for assigning a key to the next index in the subsequent state corresponding to each state and each character for the first index, the second index and the third index.

FIG. 4 shows a flowchart of the process for generating a set of key chains. FIG. 5 shows an example of keys for various states generated for each index. FIG. 6 shows an example of a transition table for an automaton, and key tables for assigning a key to the next index in the subsequent state corresponding to each state and each character for the first index, the second index and the third index.

The server 20 performs the process from Step S31 to Step S42 below as the key chain set generating process in Step S13 of FIG. 3.

First, in Step S31, the server 20 generates for each index a key corresponding to each of a plurality of states included in the automaton. The server 20 also generates keys corresponding to each final state of transition.

In this situation, the server 20 generates random numbers with different values as keys. For example, when the automaton has three states (state a, state b, state c) and three keys are included in the string, the server 20 generates keys as shown in FIG. 5.

In other words, as shown in FIG. 5, the server 20 generates for the first index $r_{a0}$ as the key corresponding to state (a), $r_{b0}$ as the key corresponding to state (b), and $r_{c0}$ as the key corresponding to state (c). Also, the server 20 generates for the second index $r_{a1}$ as the key corresponding to state (a), $r_{b1}$ as the key corresponding to state (b), and rd as the key corresponding to state (c). In addition, the server 20 generates for the third index rat as the key corresponding to state (a), $r_{b2}$ as the key corresponding to state (b), and $r_{c2}$ as the key corresponding to state (c). Also, the server 20 generates for the final state of transition $r_{a3}$ as the key corresponding to state (a), $r_{b3}$ as the key corresponding to state (b), and $r_{c3}$ as the key corresponding to state (c).

Next, in the loop process from Step S32 to Step S41, the server 20 repeats for each index the process from Step S33 to Step S40. Also, in the loop process from Step S33 to Step S40, the server 20 repeats the process from Step S34 to Step S39 for each character. Also, in the loop process from Step S34 to Step S39, the server 20 repeats the process from Step S35 to Step S38 for each state.

In other words, the server 20 repeatedly executes the process from Step S35 to Step S38 for each index, each character and each state.

In Step S35, the server 20 reads the key corresponding to an index and a state that are the objects of execution from the keys generated in Step S31.

Next, in Step S36, the server 20 reads the transition table of the automaton, and identifies the subsequent state of transition in response to the input of the character to be processed in the state to be processed.

For example, in the example of a transition table shown in FIG. 6, the subsequent state is "a" when character "0" is inputted in state (a), and the subsequent state is "b" when character "1" is inputted in state (a). Also, the subsequent state is "a" when character "0" is inputted in state (b), and the subsequent state is "c" when character "1" is inputted in state (b). Also, the subsequent state is "c" when character "0" is inputted in state (c), and the subsequent state is "c" when character "1" is inputted in state (c).

Next, in Step S37, the server 20 reads the key corresponding to the subsequent state identified in Step S36 from the keys generated in Step S31 for the next index to be processed.

For example, the server 20 reads the key for the first index as shown in the key table in FIG. 6 at (A). In other words, the server 20 reads key "$r_{a1}$" when character "0" is inputted in state (a), key "$r_{b1}$" when character "1" is inputted in state (a), key "$r_{a1}$" when character "0" is inputted in state (b), key "$r_{d1}$" when character "1" is inputted in state (b), key "$r_{d1}$" when character "0" is inputted in state (c), and key "$r_{d1}$" when character "1" is inputted in state (c).

Also, for example, the server 20 reads the key for the second index as shown in the key table in FIG. 6 at (B). In other words, the server 20 reads key "$r_{a2}$" when character "0" is inputted in state (a), key "$r_{b2}$" when character "1" is inputted in state (a), key "$r_{a2}$" when character "0" is inputted in state (b), key "$r_{c2}$" when character "1" is inputted in state (b), key "$r_{c2}$" when character "0" is inputted in state (c), and key "$r_{c2}$" when character "1" is inputted in state (c).

Also, for example, the server 20 reads the key for the third index as shown in the key table in FIG. 6 at (C). In other words, the server 20 reads key "$r_{a3}$" when character "0" is inputted in state (c), key "$r_{b3}$" when character "1" is inputted in state (a), key "$r_{a3}$" when character "0" is inputted in state (b), key "$r_{c3}$" when character "1" is inputted in state (b), key "$r_{c3}$" when character "0" is inputted in state (c), and key "$r_{c3}$" when character "1" is inputted in state (c).

Next, in Step S38, the server 20 generates a key chain in which the key for the next index corresponding to the next state read in Step 37 is encrypted using the key of the index corresponding to the state read in Step S35. The encryption scheme for the key chain can be, for example, a Diffie-Hellman encryption scheme, which is a secret key encryption scheme with a message authentication code (MAC).

When the process from Step S35 to Step S38 has been executed by the server 20 for all indices, all characters and all states, and key chain generating has ended, the process proceeds to Step S42.

Next, in Step S42, the server 20 generates final state information in which a value indicating whether or not the final state of transition is the final state determined by the automaton is encrypted using the key corresponding to the final state of transition. When the server 20 has completed the process in Step S42, the flow is exited and the process is ended.

FIG. 7 shows an example of a set of key chains generated for each combination of indices, characters and states. The server 20 can generate a set of key chains as a result of executing the process from Step S31 to Step S41 in FIG. 4.

For example, when a transition table and keys for the automaton have been generated as shown in FIG. 6, the server 20 can generate a set of key chains corresponding to each combination of index, character and state as shown in FIG. 7.

Enc(x, y) represents the encrypting of data y by key x using a common key encryption scheme. A common key encryption scheme is an encryption scheme using the same key for encryption and decryption. Examples include the Data Encryption Standard (DES) and the Advanced Encryption Standard (AES).

FIG. 8 shows an example of final state information. The server 20 can generate final state information as a result of executing the process in Step S42 in FIG. 4. For example, when a transition table and keys for the automaton have been generated as shown in FIG. 6 and the appropriate final state determined by the automaton is "a", the server 20 can generate final state information as shown in FIG. 8.

In other words, the server 20 generates final state information in which a value ("1" in the present example) indicating the appropriate final transition state is encrypted using key "$r_{a3}$" corresponding to final state of transition "a". Also, final state information is generated in which a value ("0" in the present example) indicating an inappropriate final transition state is encrypted using key "$r_{b3}$" corresponding to final state of transition "b". Also, final state information is generated in which a value ("0" in the present example) indicating an inappropriate final transition state is encrypted using key "$r_{c3}$" corresponding to final state of transition "c".

FIG. 9 shows an example of indexed state transition values from the first index to the third index when a binary character of "0" or "1" is inputted. The server 20 can generate indexed state transition values as a result of executing the process in Step S14 in FIG. 3.

For example, when the automaton can accept binary characters with "0" or "1" and the number of characters included in the string is three, the server 20 generates indexed state transition values as shown in FIG. 9. In other words, the server 20 generates an indexed state transition value for each of the first through third indices and for each acceptable character "0" and "1".

FIG. 10 shows an example of sets of key chains associated with indexed state transition values. The server 20 can associate indexed state transition values with each of a plurality of key chains generated for each index, character and state as a result of executing the process in Step S15 of FIG. 3.

For example, as shown in FIG. 10, the server 20 associates an indexed state transition value f(1, 0) representing a group including the first index and character "0" with each key chain corresponding to character "0" in the first index. Also, the server 20 associates an indexed state transition value f(1, 1) representing a group including the first index and character "1" with each key chain corresponding to character "1" in the first index.

In addition, for example, as shown in FIG. 10, the server 20 associates an indexed state transition value f(2, 0) representing a group including the second index and character "0" with each key chain corresponding to character "0" in the second index. Also, the server 20 associates an indexed state transition value f(2, 1) representing a group including the second index and character "1" with each key chain corresponding to character "1" in the second index.

In addition, for example, as shown in FIG. 10, the server 20 associates an indexed state transition value f(3, 0) representing a group including the third index and character "0" with each key chain corresponding to character "0" in the third index. Also, the server 20 associates an indexed state transition value f(3, 1) representing a group including the third index and character "1" with each key chain corresponding to character "1" in the third index.

Figure 11:
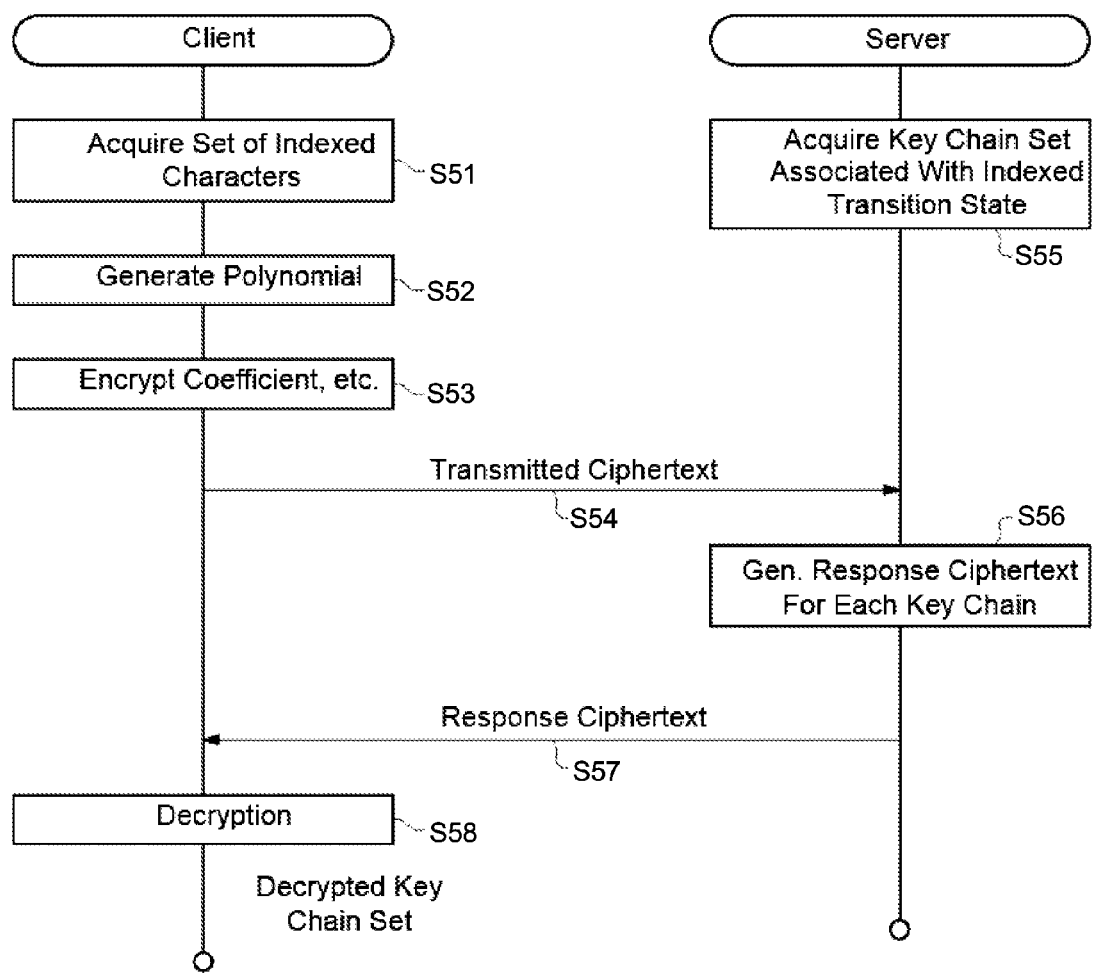
FIG. 11 shows an example of the communication process performed using the privacy-preserving set-intersection protocol in the authentication system 10 of the present embodiment.

FIG. 11 shows an example of the communication process performed using the privacy-preserving set-intersection protocol in the authentication system 10 of the present embodiment. The server 20 and the client 30 use the privacy-preserving set-intersection protocol shown from Step S51 to Step S58 below to send from the server 20 to the client 30 key chains corresponding to the characters inputted for each index among the sets of generated key chains.

First, in Step S51, the client 30 acquires sets of indexed characters. In the present example, the client 30 acquires N sets of indexed characters $g_1$-$g_N$ corresponding to the first through Nth characters $X_1$-$X_N$ as shown in Equation 6 below.

$$g(1, X_1) = g_1$$
$$g(2, X_2) = g_2$$
$$g(3, X_3) = g_3$$
$$\vdots$$
$$g(N, X_N) = g_N$$

Equation 6

Next, in Step S52, the client 30 generates a polynomial $P(x)$. The polynomial $P(x)$ is a function which becomes zero when any indexed character included in the set of indexed characters $g_1$-$g_N$ is assigned to variable x, and becomes not-zero when a value other than one of these indexed characters is assigned. In other words, client 30 generates polynomial $P(x)$ which uses any indexed character included in the set of indexed characters $g_1$-$g_N$ to solve variable x.

$$P(x) = (x - g_1)(x - g_2)(x - g_3)\cdots(x - g_N)$$
$$= l_N \cdot x^N + l_{N-1} \cdot x^{N-1} + \cdots + l_1 x + l_0$$

Equation 7

Next, in Step S53, the client 30 as shown in Equation 8 below generates a plurality of ciphertexts in which all of the coefficients in the polynomial $P(x)$ $l_N, l_{N-1}, \ldots, l_0$ and each one of the predetermined constants (for example, "1") are encrypted using an encryption scheme with homomorphism (for example, additive homomorphism). For example, the client 30 encrypts each coefficient and the predetermined constants using enhanced ElGamal encryption. $E(m)$ represents ciphertext in which plain text m is encrypted using an encryption scheme with additive homomorphism.

$$E(l_N)$$
$$E(l_{N-1})$$
$$\vdots$$
$$E(l_1)$$
$$E(l_0)$$
$$E(1)$$

Equation 8

Here, the ciphertext encrypted using an encryption scheme with additive homomorphism has the characteristics shown in Equation 9 below. In this equation, $m_1$, $m_2$ and m represent plain text.

$$E(m_1)+E(m_2)=E(m_1+m_2)$$
$$k\cdot E(m)=E(k\cdot m)$$

Equation 9

When two ciphertexts $E(m_1)$, $E(m_2)$ are provided in an encryption scheme with additive homomorphism, the result of adding the ciphertexts together ($E(m_1)+E(m_2)$) is the same as ciphertext encrypted after the plain text has been added together ($E(m_1+m_2)$). Also, the result of adding up ciphertext k times ($k\cdot E(m)$) is the same as ciphertext encrypted after multiplying plain text by given numerical value k ($E(k\cdot m)$). Here, adding ciphertext together and adding plain text together is different, but for the sake of convenience they are described using the same operational symbol "+".

Next, in Step S54, the client 30 transmits the plurality of generated transmitted ciphertexts to the server 20. In this situation, the client 30 transmits each transmitted ciphertext so the server 20 can identify them as corresponding to one of the coefficients.

Meanwhile, in Step S55, the server 20 acquires a set of key chains associated with indexed state transition values. In the present example, the server 20 acquires a set of key chains associated with indexed state transition values for each index as shown in Equation 10 below. Here, j represents the value of an index.

Equation 10

Indexed State Transition Value     Key Chain

Character 0 $\begin{cases} f(j, 0), S_{aj0} \\ f(j, 0), S_{bj0} \\ f(j, 0), S_{cj0} \end{cases}$ Character 1 $\begin{cases} f(j, 1), S_{aj1} \\ f(j, 1), S_{bj1} \\ f(j, 1), S_{cj1} \end{cases}$ Next, in Step S56, the server 20 generates response ciphertext to each of the key chains included in the set of key chains (that is, for each index, each character, and each state) on the basis of the plurality of transmitted ciphertexts transmitted from the client 30. More specifically, server 20 generates ciphertext in which values (for example, random numbers) are encrypted for each key chain included in the set of key chains which become a key chain when the corresponding indexed state transition value is included in the set of indexed characters and which does not become a key chain when the corresponding indexed state transition value is not included in the set of indexed characters on the basis of the transmitted ciphertext.

In other words, the server 20 generates the response ciphertext shown in Equation 11 below using the characteristics of quasi-isomorphic ciphertext when the indexed state transition value corresponding to the jth index and character $x_o$ is f and the key chain is S. Here, the response ciphertext shown in Equation 11 is encrypted text E in which a value obtained by multiplying by random number (r) a value $P(f)$ representing the result of assigning indexed state transition value f to variable x in polynomial $P(x)$, and a value obtained by adding key chain S are encrypted using an encryption scheme with additive homomorphism.

$$\text{Response Ciphertext}=E(r\cdot P(f)+S)$$

Equation 11

Because $P(f)=l_N\cdot f_N+l_{N-1}\cdot f_{N-1}+ \ldots +l_0\cdot f_0$ and function $E(\ )$ are quasi-isomorphic in the response ciphertext, they can be converted to $P(f)=r\cdot\{E(l_N)\cdot f^N+E(l_{N-1})\cdot f^{N-1}+ \ldots +E(l_0)\cdot f_0+E(S)\}$. In other words, the server 20 calculates values ($f^N$, $f^{N-1}, \ldots, f^1, f^0$) obtained by multiplying the indexed state transition value f by the power of each of the numbers for the variable x in polynomial $P(x)$. Next, server 20 calculates values in which each of the transmitted ciphertexts ($E(l_N)$, $E(l_{N-1})$ ..., $E(l_1)$, $E(l_0)$), in which each coefficient of the polynomial has been encrypted using an encryption scheme with additive homomorphism, is added by the number of indexed state transition values ($f^N$, $f^{N-1}$, ..., $f_1$, $f_0$) multiplied by the power of the corresponding number (in the ciphertext), and these are added and combined. After adding the added and combined values r times (in the ciphertext), the ciphertext $E(S)$, in which the key chain S has been encrypted using encryption scheme E, is added (in the ciphertext). In this way, the server 20 can generate the response ciphertext shown in Equation 11 above.

The server 20 generates this type of ciphertext for each of the plurality of key chains included in the set of key chains. For example, when response ciphertext is generated for a set of key chains associated with the index state transition values shown in Equation 10, three response ciphertexts corresponding to character "0" and three response ciphertexts corresponding to character "1" are generated for each index as shown in Equation 12 below.

$$\text{Character 0} \begin{cases} E(r_1 \cdot P(f_{(f,0)}) + S_{aj0}) \\ E(r_2 \cdot P(f_{(f,0)}) + S_{bj0}) \\ E(r_3 \cdot P(f_{(f,0)}) + S_{cj0}) \end{cases} \quad \text{Equation 12}$$

$$\text{Character 1} \begin{cases} E(r_4 \cdot P(f_{(f,1)}) + S_{aj1}) \\ E(r_5 \cdot P(f_{(f,1)}) + S_{bj1}) \\ E(r_6 \cdot P(f_{(f,1)}) + S_{cj1}) \end{cases}$$

Next, in Step S57, the server 20 transmits each of the generated ciphertexts to the client 30.

Meanwhile, in Step S58, the client 30 decrypts each of the plurality of response ciphertexts using a decryption key corresponding to the encryption key used in Step S53.

Here, the solution to the polynomial P(x) is the indexed characters $g_1$, $g_2$, $g_3$, ..., $g_N$. Therefore, when the indexed state transition value f assigned to the polynomial P(x) matches any of the indexed characters $g_1$, $g_2$, $g_3$, ..., $g_N$, the operational result of the polynomial P(x) is zero. Thus, in this case, the decryption result obtained from decryption of the response ciphertext is a key chain S.

In contrast, when the indexed state transition value f assigned to the polynomial P(x) does not match any of the indexed characters $g_1$, $g_2$, $g_3$, ..., $g_N$, the operational result of the polynomial P(x) is not-zero (for example, a random number). Thus, in this case, the decryption result obtained from decryption of the response ciphertext is not a key chain S. In this way, the client 30 can acquire a key chain corresponding to an inputted character for each index by decrypting each of a plurality of response ciphertexts.

In this way, the server 20 and the client 30 can execute a concealed intersection communication protocol to deliver from the server 20 to the client 30 key chains corresponding to inputted characters for each index while concealing the string from the server 20 and concealing the key chains corresponding to characters other than the inputted characters from the client 30.

FIG. 12 shows an example of a plurality of response ciphertexts received by the client 30 and a plurality of key chains obtained by decrypting the plurality of response ciphertexts in the present embodiment. In the present example, the client 30 receives from the server 20 a plurality of ciphertexts such as the ones shown in FIG. 12.

When the inputted string is "010", the client 30 decrypts a plurality of response ciphertexts corresponding to character "0" in the first index, a plurality of response ciphertexts corresponding to character "1" in the second index, and a plurality of response ciphertexts corresponding to character "0" in the third index. As a result, the corresponding key chains can be acquired. However, the client 30 acquires unknown values (X) as a result of decrypting other response ciphertexts.

As a result of decrypting each of a plurality of response ciphertexts, the client 30 does not differentiate between key chains and unknown values. These are, for example, stored in memory.

Figure 13:
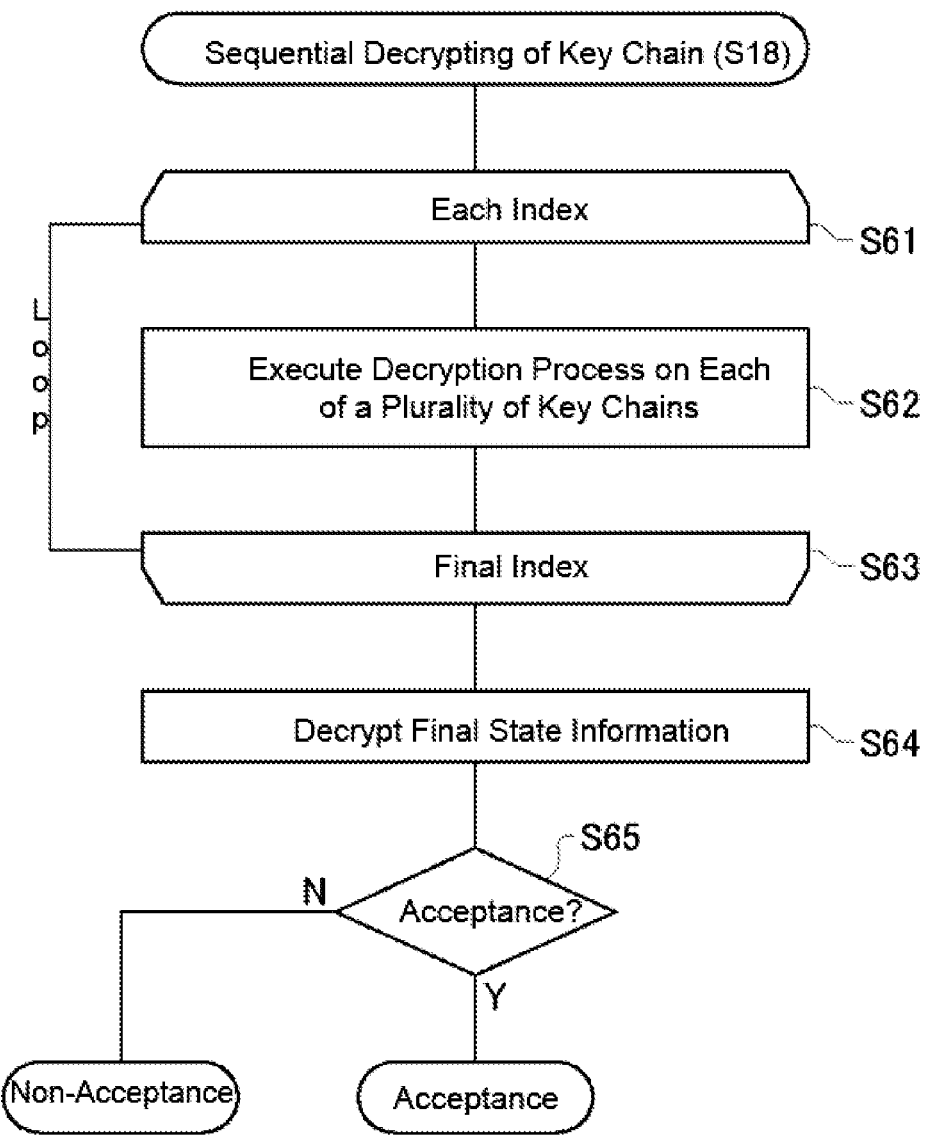
FIG. 13 shows a flowchart of the sequential decryption process for a plurality of key chains in the client 30.

FIG. 13 shows a flowchart of the sequential decryption process for a plurality of key chains in the client 30. The client 30 decrypts in successive order the key chains in Step S18 shown in FIG. 3, and executes the process from Step S61 to Step 65 below.

First, the client 30 executes the process in Step S62 in the order of the indices (the loop process between Step S61 and Step S63).

More specifically, in Step S62, the client 30 decrypts the key corresponding to the next index by decrypting each of the key chains received by the receiving unit 64 using the key decrypted for the previous index. Here, the client 30 can execute the decryption process for all of the indices on all of the decryption results of the plurality of ciphertexts received by the receiving unit 64. In other words, the client 30 obtains all of the decryption results without differentiating between key chains and unknown values.

Also, in Step S62, the client 30 obtains the keys corresponding to the second index by decrypting all of the key chains received by the receiving unit 64 using the key for the initial state in decryption corresponding to the first index. Also, in Step S62, the client 30 can decrypt the keys corresponding to the final state of transition by decrypting all of the key chains received by the receiving unit 64 in decryption corresponding to the final index corresponding to the final character in the string.

By performing this decryption processing, the client 30 can decrypt a key corresponding to the final transition state of the next index from any one key chain among all of the key chains received by the receiving unit 64 each time the decryption process is performed corresponding to each index. Also, in the decryption process corresponding to the next index, the client 30 can decrypt a key corresponding to the transition state of the next index using a key corresponding to the next index. Then, the client 30 can decrypt a key corresponding to the final state of transition by executing the decryption process corresponding to the final index of the string.

Next, in Step S64, the client 30 obtains the final state information using a key corresponding to the final state of transition obtained by executing the decryption process corresponding to the final index. As a result of obtaining the final state information, the client 30 can obtain either a value that indicates the final state or a value that does not indicate the final state.

Next, in Step S65, the client 30 determines from the results of the process in Step S64 whether or not a value indicating the final state has been decrypted. When a value indicating the final state has been decrypted, the client 30 outputs that the string has been accepted by the automaton, and the process in the flowchart is ended. When a value that does not indicate the final state has been decrypted, the client 30 outputs that the client string has not been accepted by the automaton, and the process in the flowchart is ended.

Figure 14:
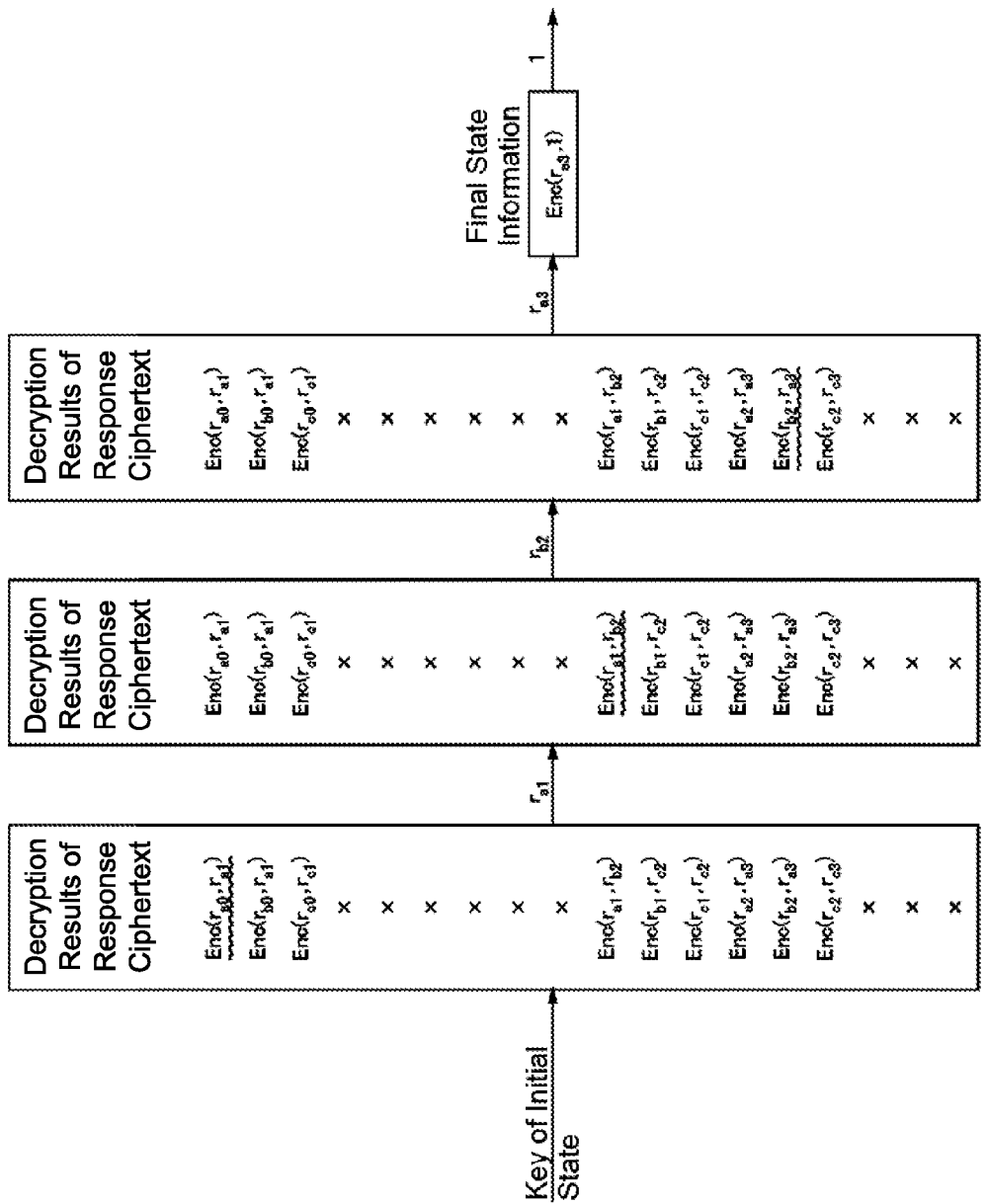
FIG. 14 shows an example of a key obtained using the sequential decryption process for a plurality of key chains in the client 30.

FIG. 14 shows an example of a key decrypted using the sequential decryption process for a plurality of key chains in the client 30. In the present example, when the inputted string is "010", the client, for example, as shown in FIG. 14, can acquire the key for the transition state of the next index from the results of decrypting each of a plurality of response ciphertexts by performing the decryption processing in sequential order on the key chains corresponding to each index (the results including a key chain or an unknown value).

In other words, the client 30 decrypts each of the decryption results of the plurality of response ciphertexts using key $r_{a0}$ of the initial state in the decryption process corresponding to the first index (the initial index). (Here, the results include key chains and unknown values.) In this way, the client 30 can acquire key $r_{a1}$ corresponding to the second index from a response ciphertext Enc($r_{a0}$, $r_{a1}$) corresponding to the automaton state (state a) in the second index among the decryption results of the plurality of response ciphertexts.

Next, the client 30 decrypts each of the decryption results of the plurality of response ciphertexts using key $r_{a1}$ decrypted during the decryption process corresponding to the previous index in the decryption process corresponding to the second index. In this way, the client 30 can acquire key $r_{a2}$ corresponding to the third index from a response ciphertext Enc($r_{a1}$, $r_{b2}$) corresponding to the automaton state (state b) in the third index among the decryption results of the plurality of response ciphertexts.

Next, the client 30 decrypts each of the decryption results of the plurality of response ciphertexts using key ria decrypted during the decryption process corresponding to the previous index in the decryption process corresponding to the third index. In this way, the client 30 can acquire key $r_{a3}$ corresponding to the final state of transition from a response ciphertext Enc($r_{b2}$, $r_{a3}$) corresponding to the automaton state (state a) of the final state of transition among the decryption results of the plurality of response ciphertexts.

Next, after performing the decryption process corresponding to the third index (the final index), the client 30 decrypts the final state information Enc($r_{a3}$, 1) using the key $r_{a3}$ corresponding to the final state of transition. In this way, the client 30 can acquire a value indicating the appropriate final state (for example, "1") from the final state information Enc($r_{a3}$, 1).

Figure 15:
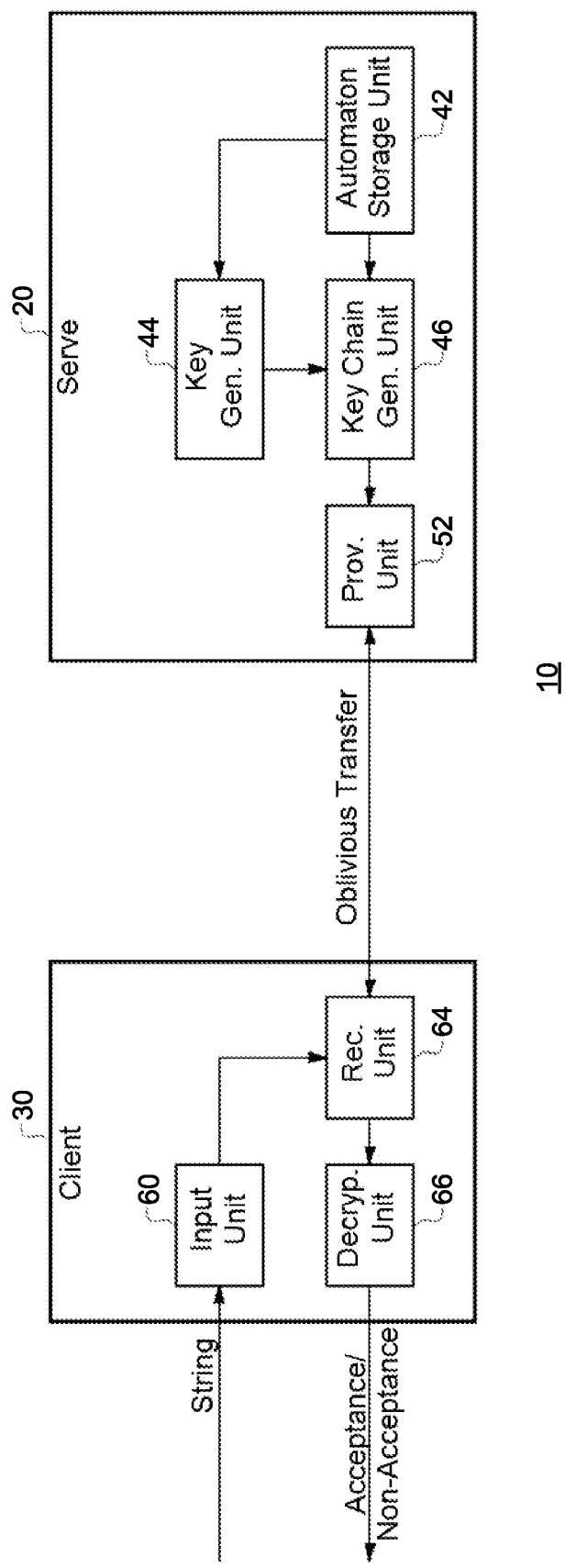
FIG. 15 shows the configuration of the authentication system 10 in a variation.

FIG. 15 shows the configuration of the authentication system 10 in a variation. The authentication system 10 in this variation has substantially identical configurational elements and functions as the authentication system 10 in the embodiment explained above with reference to FIG. 1 through FIG. 14. Therefore, in the variation, explanation of the configurational elements and functions substantially identical to those in the authentication system 10 explained above with reference to FIG. 1 through FIG. 14 has been omitted. Only the points of difference will be explained.

The server 20 has an automaton storage unit 42, a key generating unit 44, a key chain generating unit 46, and a providing unit 52. The client 30 has an input unit 60, a receiving unit 64, and a decryption unit 66.

The providing unit 52 of the server 20 communicates with the client 30 and selectively transmits to the client 30 using oblivious transfers subsets corresponding to the characters inputted by the client 30 among the sets of key chains for each index. Also, the receiving unit 64 of the client 30 communicates with the providing unit 52 of the server 20 and selectively receives from the server 20 using oblivious transfers subsets of key chains corresponding to inputted strings for each index.

Here, the providing unit 52 and the receiving unit 64 deliver subsets of key chains corresponding to inputted strings using an oblivious transfer protocol. Oblivious transfer is a protocol for transferring from a transmitting device to a receiving device a message with an identification number indicated by the receiving device among M messages held by the transmitting device without the receiving message receiving messages with other identification numbers and without the indicated identification number being identified to the transmitting device. An example of oblivious transfer is described in Even et al., "A Randomized Protocol for Signing Contracts".

Therefore, by using an oblivious transfer, the providing unit 52 can provide to the client 30 a subset of key chains corresponding to an inputted character while concealing from the client 30 the subsets of key chains other than those for the string inputted by the client 30. Also, by using an oblivious transfer, the receiving unit 64 can receive from the server 20 subsets of key chains corresponding to inputted characters while concealing the inputted characters from the server 20.

The providing unit 52 of the server 20 sorts the plurality of key chains in the subset of key chains by index, and transmits them to the client 30. In this way, the server 20 cannot estimate the state of the automaton from the decryption results.

The decryption unit 66 of the client 30 performs the decryption process on each key chain included in the subset of key chains received according to the index to decrypt the key corresponding to the next index using the key decrypted in the decryption process corresponding to the previous index in the order of the indices.

Figure 16:
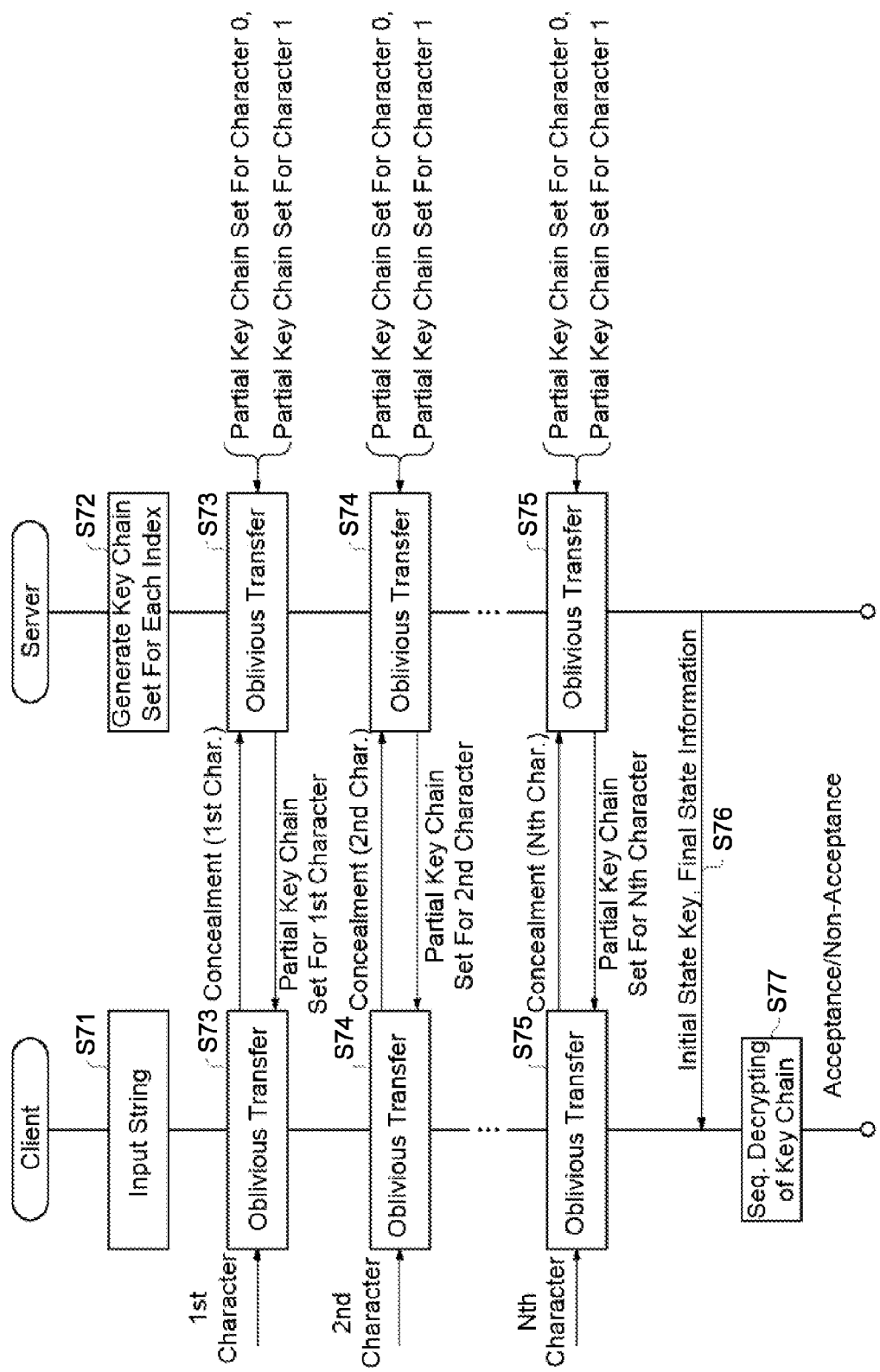
FIG. 16 shows a flowchart of processing performed by the server 20 and the client 30 in the variation.

FIG. 16 shows a flowchart of processing performed by the server 20 and the client 30 in the variation.

First, in Step S71, the client 30 inputs the string. The process in Step S71 is the same as the process in Step S11 shown in FIG. 3.

Meanwhile, in Step S72, the server 20 generates a set of key chains for each index. The processing performed in Step S72 differs from the processing in Step S13 shown in FIG. 3 in that it is performed for each index. In all other respects, the processing is identical to that in Step S13 shown in FIG. 3.

Next, in Step S73 through Step S75, the server 20 and the client 30 use an oblivious transfer protocol to deliver from the server 20 to the client 30 for each index a subset of the key chains corresponding to the characters inputted for the index among the set of key chains generated for the index. In other words, in the process for the first index (Step S73), the server 20 and the client 30 use an oblivious transfer to deliver from the server 20 to the client 30 a subset of key chains corresponding to the character inputted for the first index (that is, the first character) among the sets of key chains generated for the set of key chains in the first index.

In the process for the second index (Step S74), the server 20 and the client 30 use an oblivious transfer to deliver from the server 20 to the client 30 a subset of key chains corresponding to the character inputted for the second index (that is, the second character) among the set of key chains generated for the sets of key chains in the second index.

Afterwards, the server 20 and the client 30 execute the same process for each index from the third index to the N−1th index. Then, in the process for the Nth index (Step S75), the server 20 and the client 30 use an oblivious transfer to deliver from the server 20 to the client 30 a subset of key chains corresponding to the character inputted for the Nth index (that is, the Nth character) among the set of key chains generated for the sets of key chains in the Nth index.

An explanation of an example of the process of delivering a subset of key chains corresponding to an inputted character from the server 20 to the client 30 using an oblivious transfer is explained below with reference to the flowchart in FIG. 21 through FIG. 23.

Next, in Step S76, the server 20 transmits to the client 30 a key corresponding to the initial state and final state information.

Next, in Step S77, the client 30 uses the keys decrypted in the decryption process for the previous index in the order of indices to decrypt each subset of the key chains corresponding to the inputted characters in the current index received from the server 20, and to decrypt in sequential order the keys corresponding to the next index.

The process in Step S77 differs from the process in Step S18 of FIG. 3 in that a plurality of key chains included in a subset of key chains corresponding to the characters inputted in the current index are decrypted. In every other respect, the process is identical to the process in Step S18 of FIG. 3.

By performing this processing, the server 20 and the client 30 can determine whether or not the automaton held by the server 20 has transitioned to the appropriate final state based on the string inputted to the client 30 while concealing the string inputted by the client 30 from the server 20 and while concealing the automaton held by the server 20 from the client 30.

FIG. 17 shows an example of a set of key chains for the first index. FIG. 18 shows an example of a set of key chains for the second index. FIG. 19 shows an example of a set of key chains for the third index.

As a result of executing the process in Step S72 of FIG. 16, the server 20 can generate a set of key chains for each index. For example, when a transition table for the automaton and keys for each index are generated as shown in FIG. 5 and FIG. 6, the server 20 can generate a set of key chains for the first index as shown, for example, in FIG. 17.

Enc(x, y) represents the encrypting of data y by key x using a common key encryption scheme. A common key encryption scheme is an encryption scheme using the same key for encryption and decryption. Examples include DES and AES.

Similarly, the server 20 can also generate a set of key chains for the second index, for example, as shown in FIG. 18. Similarly, the server 20 can also generate a set of key chains for the third index, for example, as shown in FIG. 19.

The sets of key chains for each index are divided into subsets for each character. For example, as shown in FIG. 17, FIG. 18 and FIG. 19, the sets of key chains for the first index, the second index and the third index include subsets of key chains corresponding to character "0" and subsets of key chains corresponding to character "1".

During transmission to the client 30, the server 20 sorts the order of key chains in each subset randomly by index. In this way, the client 30 cannot estimate the state corresponding to the automaton from the order of the key chains.

Figure 20:
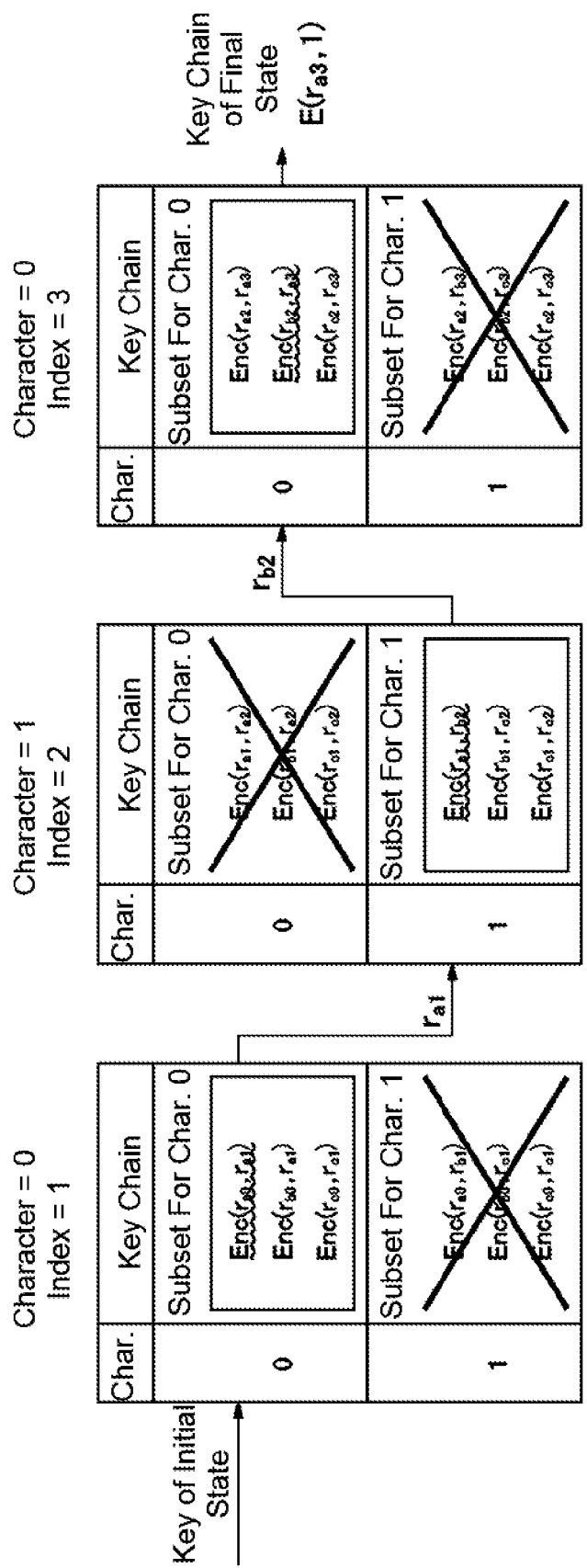
FIG. 20 shows an example of keys decrypted in sequential order from a subset of key chains for each index.

FIG. 20 shows an example of keys decrypted in sequential order from a subset of key chains for each index. The client 30 uses the oblivious communication protocol to selectively receive subsets of key chains corresponding to the inputted characters for the current index among those corresponding to each index.

For example, when three characters "010" are inputted as the string, the client 30 receives the subset of the key chain corresponding to the first character "0" in the first index and does not receive the subsets of key chains corresponding to the other character. Also, the client 30 receives the subset of the key chain corresponding to the second character "1" in the second index and does not receive the subsets of key chains corresponding to the other character. Also, the client 30 receives the subset of the key chain corresponding to the third character "0" in the third index and does not receive the subsets of key chains corresponding to the other character.

Next, the client 30 obtains the key of the next index corresponding to the state of transition from the current state by decrypting each key chain included in the subset of key chains corresponding to the inputted character received for the current index among each index in order from the initial state.

First, the client 30 decrypts each of a plurality of key chains included in the subset of key chains corresponding to the inputted character in the first index using the key corresponding to the initial state (the key of the first index corresponding to the initial state). In this way, the client 30 can obtain a key by decrypting a key chain corresponding to the initial state from subsets of key chains corresponding to the inputted character.

For example, in the example shown in FIG. 20, the client 30 executes the decryption process using the key $r_{a0}$ of the first index corresponding to the initial state on each subset of key chains corresponding to character "0" in the first index. In this way, the client 30 can decrypt the key $r_{a1}$ of the second index from a key chain $Enc(r_{a0}, r_{a1})$ corresponding to initial state "1" of character "0".

Also, the client 30 decrypts each of a plurality of key chains included in the subset of key chains corresponding to the inputted character in the second index and subsequent indices using the key decrypted in the decryption process corresponding to the previous index. In this way, the client 30 can obtain the key of the next index by decrypting a key chain corresponding to the state to which the automaton has transitioned in the current index.

For example, in the example shown in FIG. 20, the client 30 decrypts each subset of key chains corresponding to character "1" in the second index using the key $r_{a1}$ decrypted in the decryption process corresponding to the first index. In this way, key $r_{b2}$ of the third index can be decrypted by the client 30 from $Enc(r_{a1}, r_{b2})$ corresponding to state "a" of character "1".

Also, for example, in the example shown in FIG. 20, the client 30 decrypts each subset of key chains corresponding to character "0" in the third index using the key $r_{b2}$ decrypted in the decryption process of the second index. In this way, key $r_{a3}$ corresponding to the final state of transition can be decrypted by the client 30 from $Enc(r_{b2}, r_{a3})$ corresponding to state "b" of character "0".

Then, after decrypting the key corresponding to the final state of transition, the client 30 decrypts the final state information using the decrypted key. As a result of decrypting the final state information, the client 30 determines whether or not there has been a transition to the appropriate final state when the value representing the final state has been acquired.

For example, in the example shown in FIG. 20, the client 30 executes the decryption process on the final state information $Enc(r_{a3}, 1)$ using the key $r_{a3}$ decrypted in the third index. In this way, the client 30 can decrypt the value representing the final state (for example, "1"), and output information indicating that the string has been accepted by the automaton.

Thus, the server 20 and client 30 in the present embodiment can determine whether or not a string has been accepted by the automaton while concealing the string inputted by the client 30 from the server 20 and while concealing the automaton held by the server 20 from the client 30.

Figure 21:
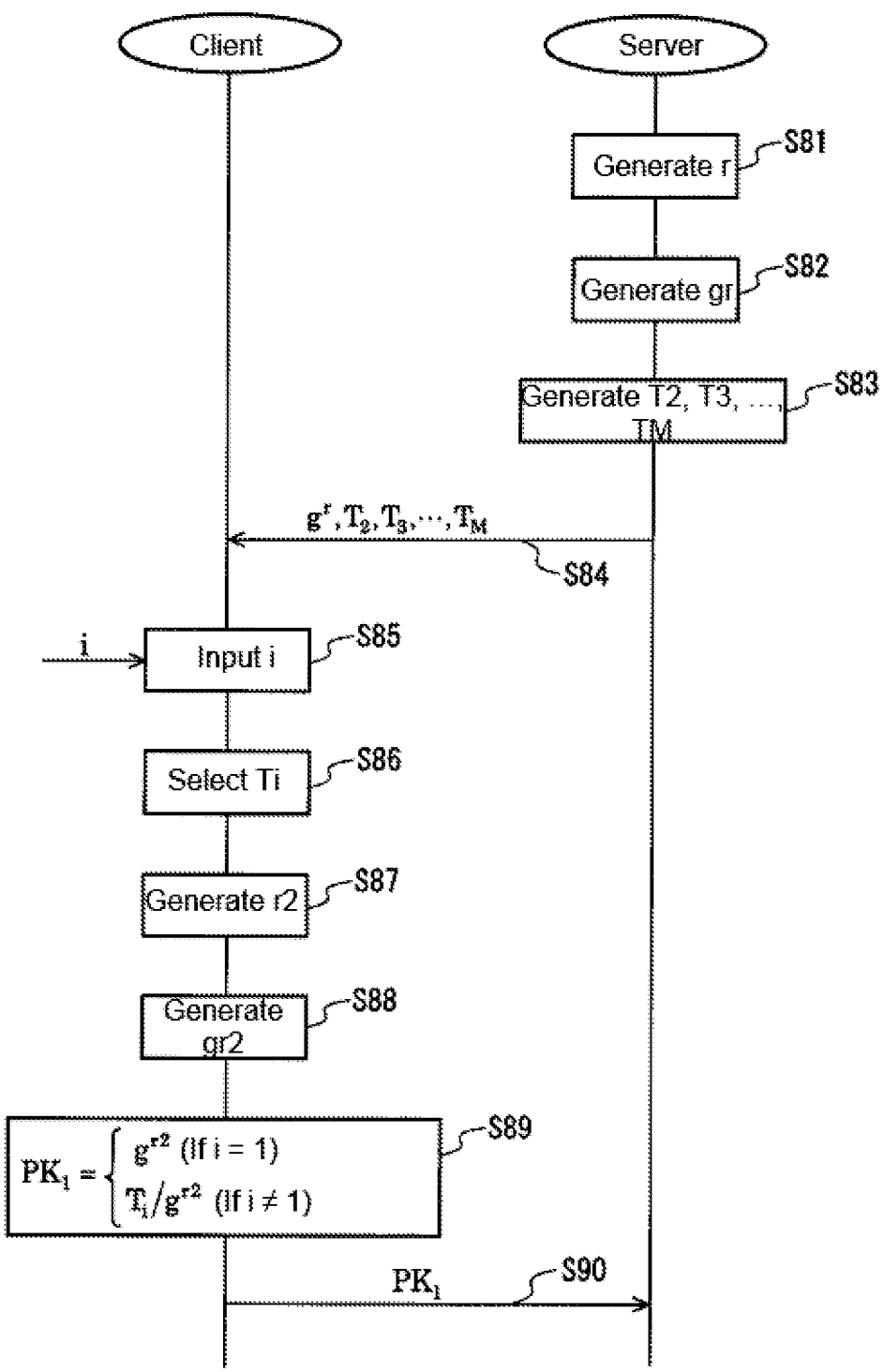
FIG. 21 shows the flow of the delivery processing for an oblivious transfer of key chain subsets between the server 20 and the client 30 in the variation.

FIG. 21 shows the flow of the delivery processing for an oblivious transfer of key chain subsets between the server 20 and the client 30 in the variation. FIG. 22 shows the flow continuing from FIG. 21. FIG. 23 shows the flow continuing from FIG. 22.

Figure 22:
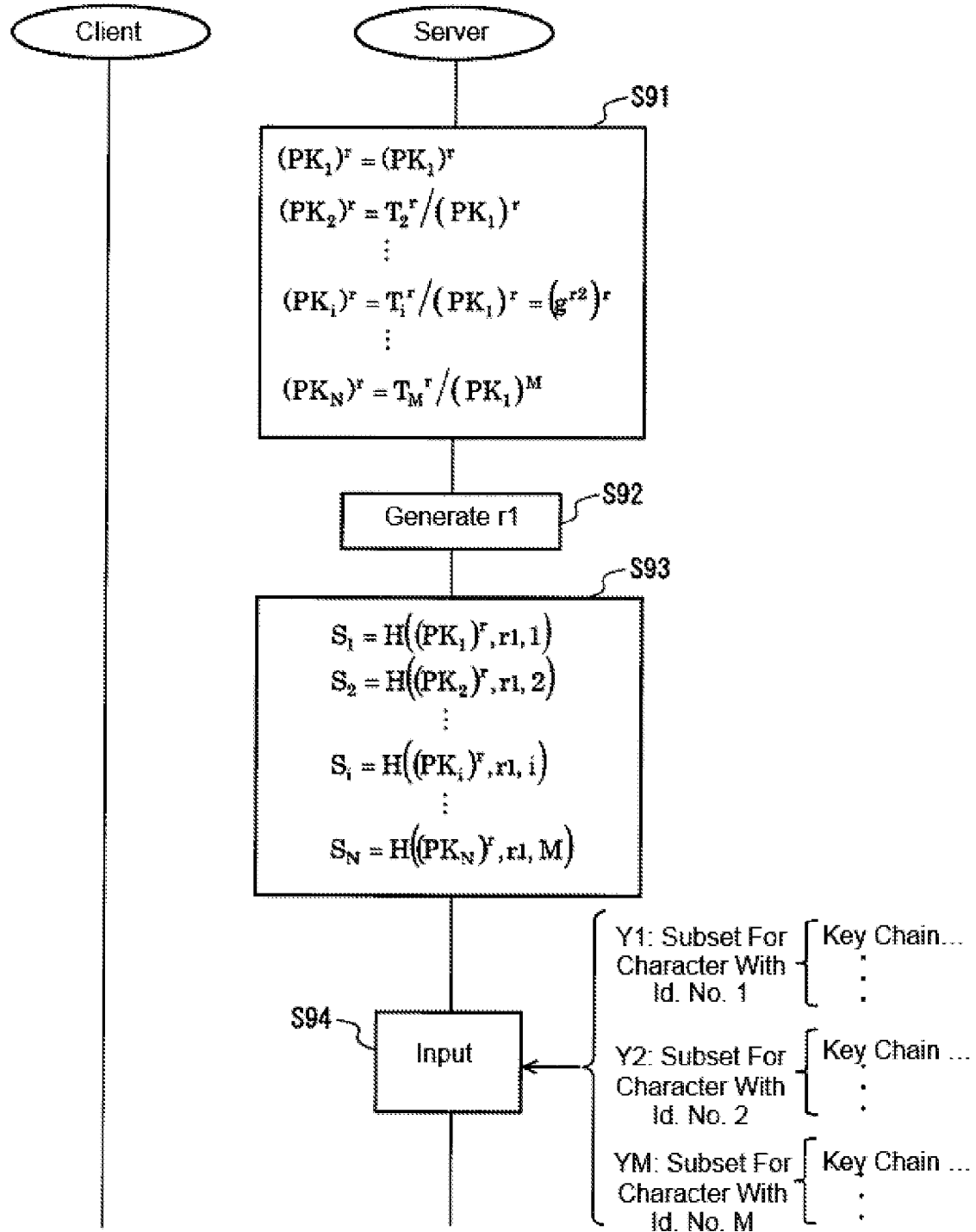
FIG. 22 shows the flow continuing from FIG. 21.
Figure 23:
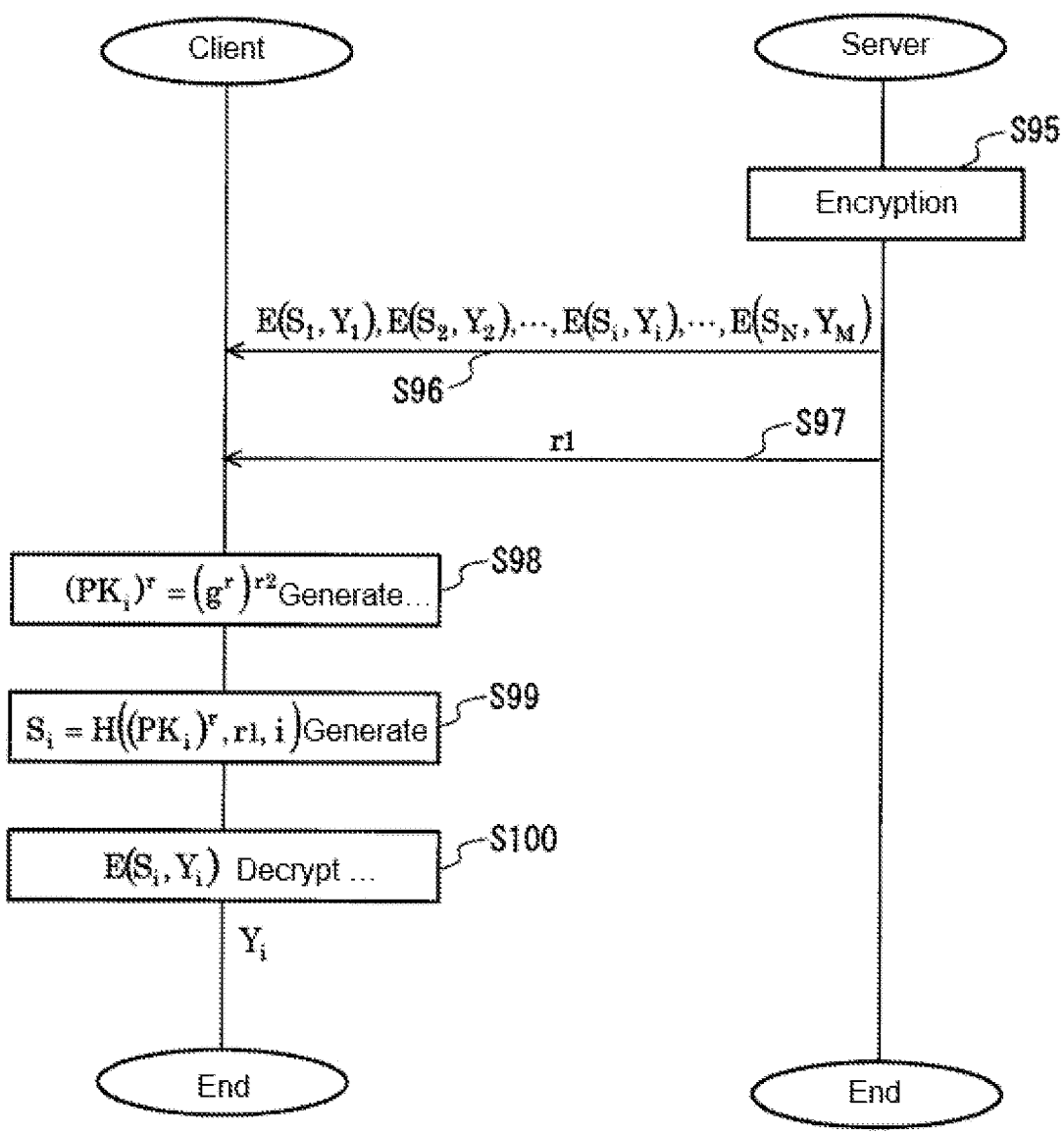
FIG. 23 shows the flow continuing from FIG. 22.

The following is an explanation of an example of a communication process with oblivious transfers executed on the processing for each index in Step S73 through Step S75 with reference to FIG. 21, FIG. 22 and FIG. 23. The oblivious transfers performed in the present embodiment are not limited to the process explained below. They can be realized using another process.

In this example, there are M characters receivable by the automaton (where M is an integer equal to or greater than 2). Also, the character inputted by the client 30 in the current index is the (ith) character with Identification No. i among the M characters.

First, in Step S81, the server 20 generates "r". Next, in Step S82, the server 20 multiplies "g" by the power "r" to generate "g$^r$".

Here, "g" represents the originator of order "q". Note that "q" is any prime number. Also, "g" is a value determined by both the server 20 and the client 30.

Also, "r" is a value selected randomly from cyclic group "$Z_q$" of the order "q". Also, "r1" and "r2" described below are values selected randomly from cyclic group "$Z_q$" of the order "q".

Next, in Step S83, the server 30 generates "$T_2$, $T_3$, $T_4$, ..., $T_M$". $T_2$, $T_3$, $T_4$, ..., $T_M$ is (M−1) integers, and identification numbers are assigned from 2 to M. Next, in Step S84, the server 20 transmits "g$^r$" and "$T_2$, $T_3$, $T_4$, ..., $T_M$" to the client 30.

The client 30 has great difficulty calculating "r" from "g$^r$" because of the nature of the discrete logarithm. Therefore, "r" is concealed from the client 30.

Next, in Step S85, the client 30 receives an identification number to identify the character inputted in the current index from among the M characters. In the present example, the client 30 receives "i" as the identification number. Here, "i" is any number between 1 and M, inclusive.

Next, in Step S86, the client 30 selects "Ti" corresponding to the ith identification number from "$T_2$, $T_3$, $T_4$, ..., $T_M$". When Identification No. i is 1 (when i=1), the client 30 does not select a value in Step S86.

Next, in Step S87, the client 30 generates "$r_2$". Next, in Step S88, the client 30 multiplies "g" by the power "$r_2$" and generates "g$^{r2}$".

Next, in Step S89, the client 30 calculates "$PK_1$". More specifically, the client 30 uses "g$^{r2}$" as "$PK_1$" ($PK_1$=g$^{r2}$) when i=1. When i≠1, the client 30 calculates "$T_i$/g$^{r2}$", and uses the calculated "$T_i$/g$^{r2}$" as "$PK_1$" ($PK_1$=$T_i$/g$^{r2}$).

Next, in Step S90, the client 30 transmits "$PK_1$" to the server 20. The server 20 has great difficulty calculating "r2" from "g$^{r2}$" because of the nature of the discrete logarithm. Therefore, "r2" is concealed from the server 20.

Next, in Step S91, the server 20 calculates $(PK_1)^r$, $(PK_2)^r$, $(PK_i)^r$, $(PK_M)^r$ on the basis of "r", "$T_2$, $T_3$, $T_4$, ..., $T_M$", and the received "$PK_1$", as shown in Equation (11) below.

Equation 13

$$(PK_1)^r = (PK_1)^r \quad (11)$$
$$(PK_2)^r = T_2^r/(PK_1)^r$$
$$\vdots$$
$$(PK_i)^r = T_i^r/(PK_1)^r = (g^{r2})^r$$
$$\vdots$$
$$(PK_M)^r = T_M^r/(PK_1)^r$$

Here, $(PK_i)^r$ becomes $g^{(r2 \cdot r)}$ as shown in Equation (12) below.

Equation 14

$$(PK_i)^r = T_i^r/(PK_1)^r \quad (12)$$
$$= T_i^r/(T_i/g^{r2})^r$$
$$= (g^{r2})^r$$
$$= g^{(r2 \cdot r)}$$

Next, in Step S92, the server 20 generates "r1".

Next, in Step S93, the server 20 generates M encryption keys "$S_1$, $S_2$, ..., $S_i$, ..., $S_M$" as shown in Equation (13) below.

Equation 15

$$S_1 = H((PK_1)^r, r1, 1) \quad (13)$$
$$S_2 = H(PK_2)^r, r1, 2)$$
$$\vdots$$
$$S_i = H((PK_i)^r, r1, i)$$
$$\vdots$$
$$S_N H((PK_M)^r, r1, M)$$

Next, in Step S94, the server 20 inputs subsets "$Y_1$, $Y_2$, ..., $Y_M$" of M key chains for the index. In other words, the server 20 inputs from subset $Y_1$ of the character corresponding to Identification No. i=1 to subset $Y_M$ of the character corresponding to Identification No. i=M corresponding to the index.

Next, in Step S95, the server 20 encrypts each of subsets "$Y_1$, $Y_2$, ..., $Y_M$" of M key chains using the corresponding M encryption key "$S_1$, $S_2$, ..., $S_i$, $S_M$" generated in Step S93. In other words, the server 20 encrypts subset $Y_1$ of the key chain corresponding to the first character in the index using the first encryption key "$S_1$".

Also, the server 20 encrypts subset $Y_2$ of the key chain corresponding to the first character in the index using the second encryption key "$S_2$". Also, the server 20 encrypts subset $Y_i$ of the key chain corresponding to the ith character in the index using the ith encryption key "$S_i$". Also, the server 20 encrypts subset $Y_M$ of the key chain corresponding to the Mth character in the index using the Mth encryption key "$S_M$". In this way, the server 20 can generate M ciphertexts as shown in Equation (14) below.

Equation 16

$$E_{nc}(S_1, Y_1) \quad (14)$$
$$E_{nc}(S_2, Y_2)$$
$$\vdots$$
$$E_{nc}(S_i, Y_i)$$
$$\vdots$$
$$E_{nc}(S_M, Y_M)$$

Next, in Step S96, the server 20 transmits the generated M ciphertexts to the client 30. Next, in Step S97, the server 20 transmits "r1" to the client 30.

Meanwhile, in Step S98, the client 30 calculates "$(g_r)^{r2}$", which is "g$^r$" to the "r2" power. Here, $(PK_i)^r$ becomes $g^{(r2 \cdot r)}$ as shown in Equation (12). In other words, "$(g_r)^{r2}$" calculated by the client 30 in Step S98 represents "$(PK_i)^r$".

Next, in Step S99, the client 30 uses "$(PK_i)^r$", "r1" and "i" to generate the encryption key "$S_i$" corresponding to Identification No. i. Because client 30 cannot generate the values other than $(PK_i)^r$ (for example, $(PK_1)^r$, $(PK_2)^r$ and $(PK_M)^r$, etc.), encryption keys other than encryption key "$S_i$" corresponding to Identification No. i cannot be generated. Thus, client 30 cannot acquire subsets of the key chain other than subset $Y_j$ of the key chain corresponding to the character with Identification No. i.

Next, in Step S100, the client 30 decrypts subset $Y_j$ of the key chain from ciphertext $E(S_i, Y_j)$ using encryption key "$S_i$" generated in Step S99. In this way, the client 30 can acquire the subset $Y_j$ of the key chain corresponding to the character with Identification No. i.

In this way, the server 20 and the client 30 can exchange subset $Y_j$ of the key chain corresponding to the character with Identification No. i without the client 30 acquiring the subsets of the keychain other than subset $Y_j$ of the key chain corresponding to inputted character with Identification No. i for the index, and while identifying the character with Identification No. i to the server 20.

Figure 24:
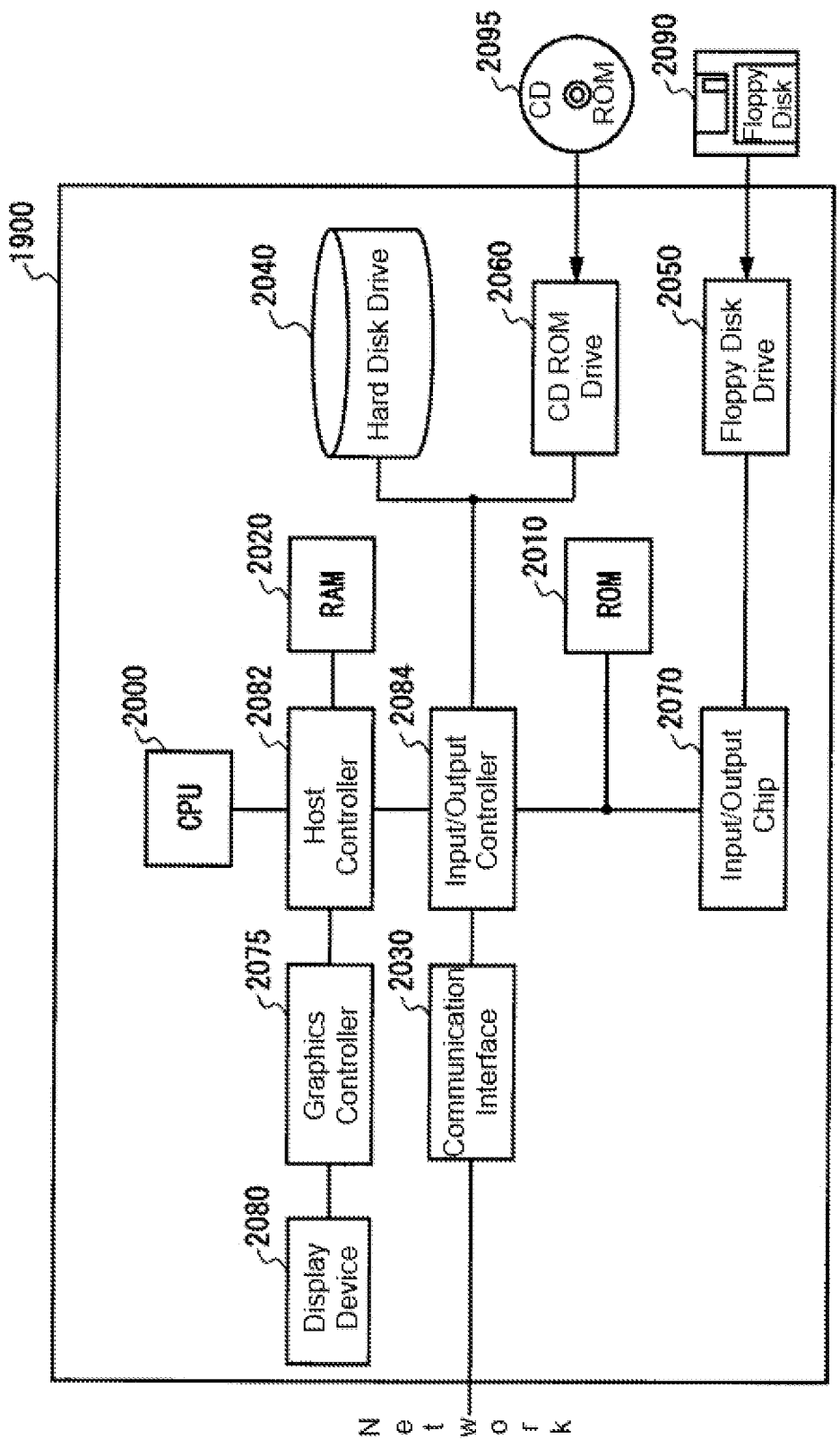
FIG. 24 shows an example of the hardware configuration of the computer 1900 in the present embodiment.

FIG. 24 shows an example of the hardware configuration of the computer 1900 in the present embodiment. The computer 1900 in the present embodiment is equipped with a CPU peripheral portion having a CPU 2000, RAM 2020, graphics controller 2075 and display 2080 connected to each other by a host controller 2082, an input/output portion having a communication interface 2030, a hard disk drive 2040 and a CD-ROM drive 2060 connected to the host controller 2082 by an input/output controller 2084, and a legacy input/output portion having a ROM 2010, floppy disk drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units. The graphics controller 2075 acquires the image data generated in the frame buffer of the RAM 2020 by the CPU 2000 and other units, and displays this image data on the display device 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, a hard disk drive 2040, and a CD-ROM drive 2060. The communication interface 2030 communicates with the other devices via a network. The hard disk drive 2040 stores the programs and data used by the CPU 2000 in the computer 1900. The CD-ROM drive 2060 reads programs and data from the CD-ROM 2095 and provides them to the hard disk drive 2040 via the RAM 2020.

The input/output controller 2084 is connected to the ROM 2010, the floppy disk drive 2050, and the relatively low-speed input/output device of the input/output chip 2070. The ROM 2010 stores the boot program executed by the computer 1900 at startup and/or programs relying on hardware in the computer 1900. The floppy disk drive 2050 reads programs or data from a floppy disk 2090, and provides the programs and data to the hard disk drive 2040 via the RAM 2020. The input/output chip 2070 connects the floppy disk drive 2050 to the input/output controller 2084. Various types of input/output device are connected to the input/output controller 2084 via a parallel port, serial port, keyboard port, mouse port, etc.

A program provided to the hard disk drive 2040 via the RAM 2020 is stored on a recording medium such as a floppy disk 2090, CD-ROM 2095 or IC card, and provided by the user. A program is read from the recording medium, installed in the hard disk drive 2040 inside the computer 1900 via the RAM 2020, and executed by the CPU 2000.

A program installed in a computer 1900 to enable the computer 1900 to function as a server 20 includes an automaton storing module, a key generating module, a key chain generating module, an indexed state transition value generating module, a synthesis module, and a providing module. This program or the modules are activated by the CPU 2000 and other units to enable the computer 1900 to function as an automaton storage unit 42, a key generating unit 44, a key chain generating unit 46, an indexed state transition value generating unit 48, a synthesis unit 50, and a providing unit 52.

The information processing described in these programs are specific means activated by reading the programs to the computer 1900 so that the software cooperates with the various types of hardware resources described above. This information processing functions as an automaton storage unit 42, a key generating unit 44, a key chain generating unit 46, an indexed state transition value generating unit 48, a synthesis unit 50, and a providing unit 52. These specific means realize operations and the processing of information in accordance with the intended purpose of the computer 1900 in the present embodiment to construct a dedicated server 20 for this intended purpose.

A program installed in a computer 1900 to enable the computer 1900 to function as a client 30 includes an input module, an indexed character generating module, a receiving module and a decryption module. This program or the modules are activated by the CPU 2000 and other units to enable the computer 1900 to function as an input unit 60, an indexed character generating unit 62, a receiving unit 64, and a decryption unit 66.

The information processing described in these programs are specific means activated by reading the programs to the computer 1900 so that the software cooperates with the various types of hardware resources described above. This information processing functions as an input unit 60, an indexed character generating unit 62, a receiving unit 64, and a decryption unit 66. These specific means realize operations and the processing of information in accordance with the intended purpose of the computer 1900 in the present embodiment to construct a dedicated client 30 for this intended purpose.

For example, when the computer 1900 communicates with an external device, the CPU 2000 executes the communication program loaded in the RAM 2020, and instructs the communication interface 2030 in the communication processing on the basis of the processing content described in the communication program. The communication interface 2030 is controlled by the CPU 2000, and reads the transmitted data stored in the transmission buffer region of a memory device such as the RAM 2020, hard disk drive 2040, floppy disk 2090 or CD-ROM 2095, or writes reception data received from the network to a reception buffer region of the storage device. In this way, the communication interface 2030 transfers transmitted and received data to the storage device using the direct memory access (DMA) method. Alternatively, the CPU 2000 transfers transmitted and received data by reading data from the source storage device or communication interface 2030, and transfers, and writing data to the destination communication interface 2030 or storage device.

Also, the CPU 2000 writes all of the data or the necessary data to the RAM 2020 via, for example, a DMA transfer, from files or databases stored in an external storage device such as a hard disk drive 2040, a CD-ROM drive 2060 (CD-ROM 2095) or a floppy disk drive 2050 (floppy disk 2090), and performs various types of processing on the data in the RAM 2020. The CPU 2000 then writes the processed data to the external storage device via, for example, a DMA transfer. Because the RAM 2020 temporarily stores the contents of the external storage device during this process, the RAM 2020 and the external storage device are generally referred to in the present embodiment as memory, a storage unit, or a storage device. The various types of information in the various types of programs, data, tables and databases of the present embodiment are stored in these memory devices, and are the targets of information processing. The CPU 2000 can hold some of the RAM 2020 in cache memory, and read and write data to the cache memory. Here, the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and replacement described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as large, small, greater than, less than or equal have been satisfied. When a condition has been satisfied (or not satisfied), the process branches to a different sequence of instructions or calls up a subroutine.

The CPU 2000 can also retrieve information stored in files databases inside the memory device. For example, when a plurality of entries associating an attribute value for a second attribute to an attribute value for a first attribute, the CPU 2000 can retrieve an entry matching the conditions indicated by the attribute value of the first attribute among the plurality of entries stored in the storage device, and then obtaining the attribute value of the second value associated with the first value satisfying a predetermined condition by reading the attribute value of the second attribute stored in the entry.

A program or module described above can be stored in a recording medium of an external unit. Instead of a floppy disk 2090 or a CD-ROM 2905, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and processes in the devices, systems, programs and methods described in the claims, description and drawings was described using such terms as "previous" and "prior". However, these operations, steps and processes can be realized in any order as long as the output of the previous process is used by the subsequent process. The operational flow in the claims, description and drawing were explained using terms such as "first" and "next" for the sake of convenience. However, the operational flow does not necessarily have to be executed in this order.

The invention claimed is:

1. A server connectable to a client, the server comprising:
   an automaton defining a subsequent state of transition from a current state for each character in a string, wherein each character in the string is associated with an index representing a position of that character in the string;
   a key generating unit that performs operations comprising generating, for each index, a key corresponding to each of a plurality of states included in the automaton;
   a key chain generating unit that performs operations comprising generating a key chain for each combination of index, character and state, each key chain having an encrypted key comprising a key corresponding to a subsequent state of transition for a character in the string in a subsequent index, which is encrypted using a key corresponding to a current state for the character in the string and a current index; and
   a providing unit that performs operations comprising communicating with the client and providing to the client a key chain corresponding to each character in the string among a set of key chains for each index, wherein key chains corresponding to characters that are not in the string are concealed from the client.

2. The server according to claim 1, wherein the client comprises:
   a receiving unit that performs operations comprising communicating with the providing unit and receiving from the server, for each index, a plurality of key chains corresponding to a character in the string; and
   a decrypting unit that performs operations comprising decrypting a key corresponding to an index by performing decryption processing on a plurality of received key chains for that index using a key obtained by decryption processing of key chains corresponding to a previous index in a sequential order of the indices.

3. The server according to claim 2, wherein the operations performed by the providing unit further comprise:
   receiving from the client a transmitted ciphertext encrypting a set of indexed characters, wherein each indexed character expresses a group containing an index and a character in the string; and
   generating and transmitting to the client a response ciphertext, wherein when an indexed state transition value is included in the set of indexed characters, decrypting the response ciphertext results in a key chain, and when an indexed state transition value is not included in the set of indexed characters, decrypting the response ciphertext does not result in a key chain.

4. The server according to claim 3, wherein the operations performed by the receiving unit further comprise:
   performing decryption processing on each response ciphertext to acquire a plurality of encrypted key chains; and
   performing decryption processing on an acquired encrypted key chain by using
   a key decrypted in decryption processing corresponding to a previous index in the sequential order of the indices to decrypt a key corresponding to a subsequent index in the sequential order of the indices.

5. The server according to claim 4, wherein the operations performed by the providing unit further comprise:
   receiving from the client transmitted ciphertext comprising a polynomial in which each coefficient of the polynomial is encrypted using a homomorphic encryption scheme, wherein an operational result of the polynomial is zero when an indexed character is assigned to the polynomial, and the operational result of the polynomial is not-zero when a value other than an indexed character is assigned to the polynomial; and generating and transmitting to the client response ciphertext comprising a sum of values of each key chain included in the set of key chains and values obtained by multiplying indexed state transition values by assigned values in the polynomial, the sum being encrypted using the homomorphic encryption scheme.

6. The server according to claim 2, wherein the operations performed by the providing unit further comprise:

communicating with the client and selectively transmitting to the client, via oblivious transfers, a subset of the set of key chains for each index, the subset corresponding to a character in the string.

7. The server according to claim 6, wherein the receiving unit communicates with the providing unit and selectively receives from the server, via oblivious transfer, the subset of key chains for each index, and the decrypting unit decrypts keys corresponding to an index by performing decryption processing on each key chain included in a received subset of key chains corresponding to that index using a key obtained by decryption processing of key chains corresponding to a previous index in the sequential order of the indices.

8. The server according to claim 7, wherein the providing unit encrypts, for each index, a subset of the set of key chains corresponding to each character in the string while the string is concealed from the server.

9. The server according to claim 8, wherein the client decrypts a received subset corresponding to a character in the string using an encryption key corresponding to that character.

10. The server according to claim 6, wherein the providing unit sorts a plurality of key chains by index and transmits the sorted plurality of key chains to the client.

11. The server according to claim 1, wherein the operations performed by key chain generating unit further comprise:

generating a key chain comprising a key corresponding to a final transition state encrypted using a key corresponding to a current state in an index corresponding to a final character in the string; and generating final state information comprising a value indicating whether or not the final transition state is a final state determined beforehand by the automaton.

12. A computer program product comprising a non-transitory computer readable storage medium having program instructions embedded therein that, when run by a processor device on a computer, enable the computer to function as the server of claim 1.

13. The server of claim 1, wherein the string is concealed from the server.

14. A client for inputting a string, the client being able to communicate with a server having an automaton defining a subsequent state of transition from a current state for each character in the string, wherein each character in the string is associated with an index representing a position of that character in the string, the client comprising:

a receiving unit that performs operations comprising communicating with the server and receiving from the server, for each index, a plurality of key chains corresponding to a character in the string; and a decrypting unit that performs operations comprising decrypting a key corresponding to an index by performing decryption processing on a plurality of received key chains for that index using a key obtained by decryption processing of key chains corresponding to a previous index in a sequential order of the indices.

15. A computer program product comprising a non-transitory computer readable storage medium having program instructions embedded therein that, when run by a processor device on a computer, enable the computer to function as the client of claim 14.

16. An information processing method performed by a server connectable to a client, the server having an automaton defining a subsequent state of transition from a current state for each character in the string, wherein each character in the string is associated with an index representing a position of that character in the string, the method comprising:

generating a key chain for each combination of index, character and state, each key chain having an encrypted key comprising a key corresponding to a subsequent state of transition for a character in the string in a subsequent index, which is encrypted using a key corresponding to a current state for the character in the string and a current index; and providing to the client a key chain corresponding to each character in the string among a set of key chains for each index, wherein key chains corresponding to characters that are not in the string are concealed from the client.

17. The method of claim 16, wherein the string is concealed from the server.

18. An information processing method performed by a client connectable to a server, the server having an automaton defining a subsequent state of transition from a current state for each character in the string, wherein each character in the string is associated with an index representing a position of that character in the string, the method comprising:

receiving, from the server, for each index, a plurality of key chains corresponding to an character in the string; and decrypting a key corresponding to an index by performing decryption processing on a plurality of received key chains for that index using a key obtained by decryption processing of key chains corresponding to a previous index in a sequential order of the indices.

19. A non-transitory computer readable storage medium comprising program instructions that, when executed by a computer, perform operations comprising:

providing an automaton defining a subsequent state of transition from a current state for each character in a string, wherein each character in the string is associated with an index representing a position of that character in the string;

generating, for each index, a key corresponding to each of a plurality of states included in the automaton;

generating a key chain for each combination of index, character and state, each key chain having an encrypted key comprising a key corresponding to a subsequent state of transition for a character in the string in a subsequent index, which is encrypted using a key corresponding to a current state for the character in the string and a current index; and communicating with a client and providing to the client a key chain corresponding to each character in the string among a set of key chains for each index, wherein key chains corresponding to characters that are not in the string are concealed from the client.

20. The recording medium of claim 19, wherein the string is concealed from the server.

* * * * *